(12) United States Patent
Tsuji et al.

(10) Patent No.: US 7,028,656 B2
(45) Date of Patent: Apr. 18, 2006

(54) START CONTROL APPARATUS FOR INTERNAL COMBUSTION ENGINE

(75) Inventors: Kimitoshi Tsuji, Susono (JP); Yasushi Kusaka, Susono (JP); Kenji Kataoka, Susono (JP); Toshiaki Asada, Mishima (JP); Shinichi Mitani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 11 days.

(21) Appl. No.: 11/024,712

(22) Filed: Dec. 30, 2004

(65) Prior Publication Data

US 2005/0115534 A1   Jun. 2, 2005

Related U.S. Application Data

(63) Continuation-in-part of application No. PCT/JP03/11161, filed on Sep. 1, 2003.

(30) Foreign Application Priority Data

Oct. 22, 2002   (JP) .............................. 2002-307223
Dec. 24, 2002   (JP) .............................. 2002-371972

(51) Int. Cl.
*F02N 17/00* (2006.01)
(52) U.S. Cl. .................. 123/179.16; 123/491
(58) Field of Classification Search .......... 123/179.16, 123/179.5, 406.47, 491
See application file for complete search history.

(56) References Cited

U.S. PATENT DOCUMENTS

| | | | | |
|---|---|---|---|---|
| 5,836,288 A | * | 11/1998 | Nakagawa | 123/491 |
| 5,893,349 A | * | 4/1999 | Rado | 123/406.42 |
| 6,032,632 A | * | 3/2000 | Bolenz et al. | 123/179.3 |
| 6,040,634 A | * | 3/2000 | Larguier | 290/45 |
| 6,050,231 A | * | 4/2000 | Tisch et al. | 123/179.1 |
| 6,050,232 A | * | 4/2000 | Grob et al. | 123/179.16 |
| 6,098,585 A | * | 8/2000 | Brehob et al. | 123/179.5 |
| 6,286,470 B1 | * | 9/2001 | Riksen et al. | 123/179.3 |
| 6,453,864 B1 | * | 9/2002 | Downs et al. | 123/179.3 |
| 6,681,173 B1 | * | 1/2004 | Turner et al. | 701/113 |
| 6,772,723 B1 | * | 8/2004 | Aoki et al. | 123/179.4 |
| 6,807,934 B1 | * | 10/2004 | Kataoka et al. | 123/179.4 |
| 6,834,632 B1 | * | 12/2004 | Kataoka et al. | 123/179.4 |
| 2004/0216719 A1 | * | 11/2004 | Condemine et al. | 123/406.47 |

FOREIGN PATENT DOCUMENTS

| | | |
|---|---|---|
| JP | 2001-173477 | 6/2001 |
| JP | 2001-173487 | 6/2001 |
| JP | 2001-342876 | 12/2001 |
| JP | 2002-4985 | 1/2002 |
| JP | 2003-65105 | 3/2003 |

* cited by examiner

Primary Examiner—Henry C. Yuen
Assistant Examiner—Arnold Castro
(74) Attorney, Agent, or Firm—Oliff & Berridge, PLC

(57) ABSTRACT

A start control apparatus for an internal combustion engine according to the present invention is characterized by that in a port injection type internal combustion engine, fuel is supplied in the interior of a cylinder that is in its compression stroke or expansion stroke upon stoppage of the internal combustion engine, and upon the next start of the internal combustion engine, the fuel in the interior of the aforementioned cylinder is burned to rotate the engine output shaft utilizing the pressure generated when the fuel is burned. Thus, the torque required for cranking the internal combustion engine is reduced and the load applied on a starter apparatus such as a starter motor is reduced.

27 Claims, 11 Drawing Sheets

START CONTROL APPARATUS FOR INTERNAL COMBUSTION ENGINE

This is a continuation-in-part application of Application PCT/JP03/11161, filed Sep. 1, 2003, which was published under PCT Article 21(2) in Japanese.

BACKGROUND OF THE INVENTION

1. Field of the Invention

The present invention relates to an internal combustion engine mounted on an a vehicle or the like, and in particular to a start control technology for an internal combustion engine

2. Description of the Related Art

In recent years, an electric motor is generally used as means for rotationally driving (i.e. cranking) a crankshaft upon starting an internal combustion engine. It is necessary for such an electric motor to rotationally drive the crankshaft while resisting a gas compression force or frictions generated in various portions of the internal combustion engine. Hence, the electric motor tends to have high rated performance and power consumption of the electric motor also tends to become large accordingly.

In particular, in the system in which the operation of the internal combustion engine is automatically stopped while the vehicle is at rest (i.e. a so-called idle stop system), since there is a possibility that stopping and starting of the driving of the internal combustion engine are repeated frequently, there is a concern that the load applied on the electric motor will become large to thereby further increase the power consumption of the electric motor.

In view of this, there has been disclosed such a technology in which a cylinder that is in its expansion stroke in the state in which the driving of the internal combustion engine is being stopped is detected and fuel is injected into that cylinder to cause combustion, to thereby reduce the load applied on the electric motor.

The above-described prior art technology is effective for internal combustion engines provided with a fuel injection valve adapted to inject fuel directly into a cylinder (i.e. so-called direct injection type internal combustion engines), but it is difficult to say that this technology is effective for internal combustion engines provided with a fuel injection valve adapted to inject fuel to an intake port of a cylinder (i.e. so-called port injection type internal combustion engines).

SUMMARY OF THE INVENTION

The present invention has been made in view of the above-described problem. An object of the present invention is to provide a technology that enables efficient starting of a port injection type internal combustion engine.

In order to achieve the above-described object, the present invention adopts the following portion. That is, a start control apparatus for an internal combustion engine according to the present invention comprises:

a fuel injection valve for injecting fuel into an intake passage of the internal combustion engine;

an ignition plug for igniting in the interior of a cylinder of the internal combustion engine;

an ignition suspending portion for suspending the operation of said ignition plug, when a driving stop condition for the internal combustion engine is met; and a start control portion for causing the ignition plug of a cylinder that is on the expansion stroke to operate, when a start condition for the internal combustion engine is met, wherein said ignition suspending portion once suspends the operation of said ignition plug and said fuel injection valve when said driving stop condition is met and causes only said fuel injection valve to operate again just before rotation of an engine output shaft of the internal combustion engine stops.

The most significant feature of this invention is that in an internal combustion engine equipped with a fuel injection valve(s) for injecting fuel into an intake passage, when a condition for stopping the driving of the internal combustion engine is met, the operation of an ignition plug(s) is suspended while the operation of the fuel injection valve(s) is continued to stop the driving of the internal combustion engine, and to seal unburned fuel in the cylinder that is in the expansion stroke upon stoppage of the internal combustion engine, and upon starting the internal combustion engine subsequently, the fuel in the interior of the aforementioned cylinder is burned so that the internal combustion engine is started utilizing the pressure generated upon combustion of the fuel.

In this start control apparatus for an internal combustion engine, when a requirement for stopping the driving of the internal combustion engine arises, the ignition suspending portion suspends the operation of only the ignition plug.

In this case, since the fuel injection valve continues to operate, the fuel injected from the fuel injection valve into the intake passage is taken into the interior of the cylinder of the internal combustion engine together with air in the intake passage to form air-fuel mixture. However, since the operation of the ignition plug has already been suspended, the air-fuel mixture formed in the interior of the cylinder of the internal combustion engine will not be burned.

As a result, rotation of the engine output shaft (i.e. the crankshaft) stops and the driving of the internal combustion engine stops, so that unburned air-fuel mixture is sealed in the cylinder that is on the expansion stroke at that time (which will be referred to as the expansion stroke cylinder upon stoppage hereinafter).

Subsequently, when the start condition for the internal combustion engine is met, the start control portion causes the ignition plug of the expansion stroke cylinder upon stoppage to operate to burn the unburned air fuel mixture sealed in the expansion stroke cylinder upon stoppage.

When the air-fuel mixture is burned in the expansion stroke cylinder upon stoppage as described above, the combustion pressure generated thereby acts to rotate the engine output shaft, and therefore the torque required for cranking the internal combustion engine is reduced.

As a result, the load on a starter apparatus such as a starter motor or a motor generator is reduced.

Furthermore, in the start control apparatus for an internal combustion engine according to the present invention, the ignition suspending portion is adopted to once suspend the operation of the ignition plug and the operation of the fuel injection valve when a requirement for stopping the driving of the internal combustion engine arises and to operate only the fuel injection valve again just before rotation of the engine output shaft of the internal combustion engine stops.

Thanks to this feature, it is possible to prevent the fuel injected from the fuel injection valve just after the establishment of the driving stop condition for the internal combustion engine from being not staying in the cylinder but exhausted, even if the engine output shaft rotates several times from the time when the driving stop condition for the internal combustion engine is met to the time when the driving of the internal combustion engine actually stops.

Furthermore, in the start control apparatus for an internal combustion engine according to the present invention, the start control portion may be adapted to start the internal combustion engine forcibly in case that driving stop time of the internal combustion engine becomes longer than a predetermined time period.

This is because if the driving stop time of the internal combustion engine becomes excessively long, it is considered that the air-fuel mixture sealed in the interior of the expansion stroke cylinder upon stoppage will be separated into fuel and air and leakage through a gap between the piston and the cylinder etc. will occur.

Secondly, in order to achieve the aforementioned object, the present invention may adopt the following portion. That is, a start control apparatus for an internal combustion engine according to the present invention may comprise:

a fuel injection valve for injecting fuel into an intake passage of the internal combustion engine;

an ignition plug for igniting in the interior of a cylinder of the internal combustion engine;

a driving stop portion for suspending the operation of said ignition plug and said fuel injection valve, when a driving stop condition for the internal combustion engine is met;

An estimate portion for estimating a cylinder that will be on the expansion stroke upon stoppage of rotation of an engine output shaft of the internal combustion engine;

a fuel injection control portion for causing the fuel injection valve of the cylinder that is estimated by said estimate portion to operate again, just before rotation of the engine output shaft of the internal combustion engine stops; and a start control portion for causing the ignition plug of the cylinder that is estimated by said estimate portion to operate, when a start condition for the internal combustion engine is met.

The most significant feature of this invention is that in an internal combustion engine equipped with a fuel injection valve(s) for injecting fuel into an intake passage, the cylinder that will be on the expansion stroke upon stoppage of the internal combustion engine is estimated and fuel is supplied to that cylinder in advance just before the driving of the internal combustion engine stops, and upon starting the internal combustion engine subsequently, the fuel in the interior of that cylinder is burned so as to start the internal combustion engine utilizing the pressure generated thereby.

In this start control apparatus for an internal combustion engine, the driving stop portion suspends the operation of the ignition plug and the operation of the fuel combustion valve when the driving stop condition for the internal combustion engine is met. Once the operation of the ignition plug and the fuel injection valve is suspended, the rotation of the engine output shaft is gradually slowed down.

On that occasion, the estimate portion estimates the cylinder that will be on its expansion stroke when the rotation of the engine output shaft stops (such a cylinder will be referred to as the expansion stroke cylinder upon stoppage hereinafter). Subsequently, the fuel injection control portion causes the fuel injection valve of the aforementioned expansion stroke cylinder upon stoppage to operate just before the rotation of the engine output shaft stops.

The fuel injected from the aforementioned fuel injection valve is taken into the intake passage is taken into the expansion stroke cylinder upon stoppage together with air in the intake passage to form air-fuel mixture while the expansion stroke cylinder upon stoppage is on the intake stroke. Subsequently, the rotation of the engine output shaft stops when the expansion stroke cylinder upon stoppage gets on the expansion stroke after undergoing the compression stroke.

As a result, the driving of the internal combustion engine stops in the state in which unburned air-fuel mixture is sealed in the interior of the expansion stroke cylinder upon stoppage.

Upon the next start of the internal combustion engine, the start control portion causes the ignition plug of the expansion stroke cylinder upon stoppage to operate so that the unburned air-fuel mixture in the interior of the expansion stroke cylinder upon stoppage is burned.

When the air-fuel mixture is burned in the expansion stroke cylinder upon stoppage as above, the combustion pressure generated thereby acts to rotate the engine output shaft, and therefore the torque required for cranking the internal combustion engine is reduced.

As a result, the load on a starter apparatus such as a starter motor or a motor generator is reduced.

The start control apparatus for an internal combustion engine according to the present invention may be provided with an output shaft rotating portion for rotating, in case that rotation of the engine output shaft stops before the expansion stroke cylinder upon stoppage gets on the expansion stroke, the engine output shaft until the expansion stroke cylinder upon stoppage gets on the expansion stroke.

This output shaft rotating portion may be adapted to rotate, upon stoppage of the driving of the internal combustion engine (for example when the rotation of the engine output shaft stops), the engine output shaft until the expansion stroke cylinder upon stoppage gets on the expansion stroke, or alternatively to rotate the engine output shaft until the expansion stroke cylinder upon stoppage gets on the expansion stroke upon the next start of the internal combustion engine.

In this case, the start control portion may be adapted to cause the ignition plug of the expansion stroke cylinder upon stoppage to operate at the time when the aforementioned expansion stroke cylinder upon stoppage gets on the expansion stroke.

In the case that the engine output shaft is rotated until the expansion stroke cylinder upon stoppage gets on the expansion stroke, although it is necessary to cause a starter apparatus such as a starter motor or a motor generator to operate, the operating time thereof is very short. In addition, the air-fuel mixture in the interior of the expansion stroke cylinder upon stoppage is burned at the time when the expansion stroke cylinder upon stoppage gets on the expansion stroke, and the combustion pressure generated thereby acts to rotate the engine output shaft. Consequently, the load applied on the starter apparatus is reduced after the expansion stroke cylinder upon stoppage shifts from the compression stroke to the expansion stroke.

Furthermore, in the start control apparatus for an internal combustion engine according to the present invention, the estimate portion may be adapted to estimate the cylinder that is on the compression stroke when the rotation of the engine output shaft of the internal combustion engine stops (which will be referred to as the compression stroke cylinder upon stoppage hereinafter) instead of the expansion stroke cylinder upon stoppage.

In this case, the fuel injection control portion causes to fuel injection valve of the cylinder that is estimated by the estimate portion to operate again just before the rotation of the engine output shaft of the internal combustion engine stops. The output shaft rotating portion rotates the engine output shaft until the cylinder estimated by the estimate portion gets on the expansion stroke. In addition, the start control portion causes the ignition plug of the compression stroke cylinder upon stoppage to operate, when the start condition for the internal combustion engine is met.

When the air-fuel mixture in the interior of the compression stroke cylinder upon stoppage is burned while the engine output shaft has rotated until the compression stroke cylinder upon stoppage gets on the expansion stroke as described above, the combustion pressure generated thereby acts to rotate the engine output shaft. Consequently, the torque required for cranking the internal combustion engine is reduced.

In the case that the engine output shaft is rotated until the compression stroke cylinder upon stoppage gets on the expansion stroke, although it is necessary to cause a starter apparatus such as a starter motor or a motor generator to operate, the operating time thereof is very short. In addition, since the unburned air-fuel mixture in the interior of the compression stroke cylinder upon stoppage is burned at the time when the compression stroke cylinder upon stoppage gets on the expansion stroke and the combustion pressure generated thereby acts to rotate the engine output shaft, the load applied on the starter apparatus is reduced after the compression stroke cylinder upon stoppage shifts from the compression stroke to the expansion stroke.

As a result, the load applied on the starter apparatus such as a starter motor or a motor generator is reduced.

Furthermore, in the start control apparatus for an internal combustion engine according to the present invention, the start control portion may be adapted to start the internal combustion engine forcibly in case that the driving stop time of the internal combustion engine becomes longer than a predetermined time period.

This is because if the driving stop time of the internal combustion engine becomes excessively long, it is considered that the air-fuel mixture sealed in the interior of the expansion stroke cylinder upon stoppage will be separated into fuel and air and leakage through a gap between the piston and the cylinder etc. will occur.

Still further, the start control apparatus for an internal combustion engine according to the present invention may be adapted in such a way that the estimate portion estimates the cylinder that will be on the compression stroke upon stoppage of the rotation of the engine output shaft (which will be referred to as the compression stroke cylinder upon stoppage hereinafter) in addition to the cylinder that will be on the expansion stroke (i.e. the expansion stroke cylinder upon stoppage), and the fuel injection control portion causes the fuel injection valve of the compression stroke cylinder upon stoppage and the fuel injection valve of the expansion stroke cylinder upon stoppage to operate just before the stoppage of the rotation of the engine output shaft so as to seal unburned air-fuel mixture in the interior of the compression stroke cylinder upon stoppage and the expansion stroke cylinder upon stoppage.

In this case, when the start condition for the internal combustion engine is met next time, the start control portion may cause the ignition plug of the expansion stroke cylinder upon stoppage to operate firstly to rotate the engine output shaft, and subsequently cause the ignition plug of the compression stroke cylinder upon stoppage to operate at the time when the compression stroke cylinder upon stoppage gets on the expansion stroke.

When unburned air-fuel mixture is burned in the expansion stroke cylinder upon stoppage and the compression stroke cylinder upon stoppage as described above, the combustion pressure generated upon combustion of the unburned air-fuel mixture in the interior of the compression stroke cylinder acts to rotate the engine output shaft as well as the combustion pressure generated upon combustion of the unburned air-fuel mixture in the interior of the expansion stroke cylinder upon stoppage. Consequently, the torque required for cranking the internal combustion engine is further reduced.

In order to achieve the aforementioned object, the present invention may adopt the following portion. That is, a start control apparatus for an internal combustion engine according to the present invention may comprise:

a fuel injection valve for injecting fuel into an intake passage of the internal combustion engine;

an ignition plug for igniting in the interior of a cylinder of the internal combustion engine;

a driving stop portion for suspending the operation of said ignition plug and said fuel injection valve, when a driving stop condition for the internal combustion engine is met;

a fuel injection control portion for causing the fuel injection valve of a specific cylinder to operate again before rotation of an engine output shaft of the internal combustion engine stops;

an output shaft stop portion for stopping rotation of said engine output shaft at the time when said specific cylinder gets on the expansion stroke; and a start control portion for causing the ignition plug of said specific cylinder to operate, when a start condition for the internal combustion engine is met.

The most significant feature of this invention is that in an internal combustion engine equipped with a fuel injection valve(s) for injecting fuel into an intake passage, the fuel injection valve of a specific cylinder is caused to operate just before stoppage of the driving of the internal combustion engine and the driving of the internal combustion engine is stopped when the specific cylinder gets on the expansion stroke whereby unburned fuel is sealed in the interior of that specific cylinder, and upon starting the internal combustion engine subsequently, the fuel in the interior of that specific cylinder is burned so as to start the internal combustion engine utilizing the pressure generated upon combustion.

In this start control apparatus for an internal combustion engine, the driving stop portion suspends the operation of the ignition plug and the operation of the fuel injection valve when the driving stop condition for the internal combustion engine is met. If the operation of the ignition plug and the fuel injection valve is stopped, the rotation of the engine output shaft is gradually slowed down.

Just before the rotation of the engine output shaft is slowed to stop, the fuel injection control portion causes the fuel injection valve of the specific cylinder to operate. The fuel injected from the fuel injection valve into the intake passage is taken into the interior of the aforementioned specific cylinder together with air in the intake passage while the specific cylinder is on the intake stoke, to form air-fuel mixture.

Subsequently, at the time when the aforementioned specific cylinder gets on the expansion stroke after undergoing the compression stroke, the output shaft stop portion stops the rotation of the engine output shaft.

As a result, the driving of the internal combustion engine will be stopped in the state in which unburned air-fuel mixture is sealed in the specific cylinder.

Upon the next start of the internal combustion engine, the start control portion causes the ignition plug of the specific cylinder to operate so as to burn the air fuel mixture in the interior of the specific cylinder.

When the air-fuel mixture is burned in the specific cylinder as described above, the combustion pressure generated thereby acts to rotate the engine output shaft, and therefore the torque required for cranking the internal combustion engine is reduced.

As a result, the load applied on a starter apparatus such as a starter motor or a motor generator is reduced.

Furthermore, the start control apparatus according to the present invention may be provided with output shaft rotating portion for rotating, in case that rotation of the engine output shaft stops before the specific cylinder gets on the expansion stroke, the engine output shaft until the specific cylinder gets on the expansion stroke.

In this arrangement, when the driving of the internal combustion engine stops (for example when the rotation of the engine output shaft stops), the output shaft rotating portion may cause the engine output shaft to rotate until the specific cylinder gets on the expansion stroke, or rotate the engine output shaft, upon the next start of the internal combustion engine, until the specific cylinder gets on the expansion stroke.

In this case, the start control portion may cause the ignition plug of the aforementioned specific cylinder to operate at the time when that specific cylinder gets on the expansion stroke.

Furthermore, in the start control apparatus for an internal combustion engine according to the present invention, the output shaft stop portion may be adapted to stop the rotation of the engine output shaft at the time when the specific cylinder gets on the compression stroke.

In this case, the start control apparatus for an internal combustion engine according to the present invention may be provided with output shaft rotating portion for rotating the engine output shaft until the specific cylinder gets on the expansion stroke, and the output shaft rotating portion may be adapted to rotate, upon stoppage of the driving of the internal combustion engine or upon the next start of the internal combustion engine, the engine output shaft until the specific cylinder gets on the expansion stroke, and the start control portion may be adapted to cause the ignition plug of that specific cylinder to operate on condition that the specific cylinder is on the expansion stroke.

Furthermore, in the start control apparatus for an internal combustion engine according to the present invention, the start control portion may be adapted to start the internal combustion engine forcibly when the driving stop time of the internal combustion engine becomes longer than a predetermined time period.

This is because if the driving stop time of the internal combustion engine becomes excessively long, it is considered that the air-fuel mixture sealed in the interior of the specific cylinder will be separated into fuel and air and leakage through a gap between the piston and the cylinder etc. will occur.

DESCRIPTION OF THE PREFERRED EMBODIMENTS

In the following, specific embodiments of the start control apparatus for an internal combustion engine according to the present invention will be described with reference to the drawings.

[Embodiment 1]

A first embodiment of the start control apparatus for an internal combustion engine according to the present invention will be described firstly with reference to FIGS. 1 to 5.

Figure 1:
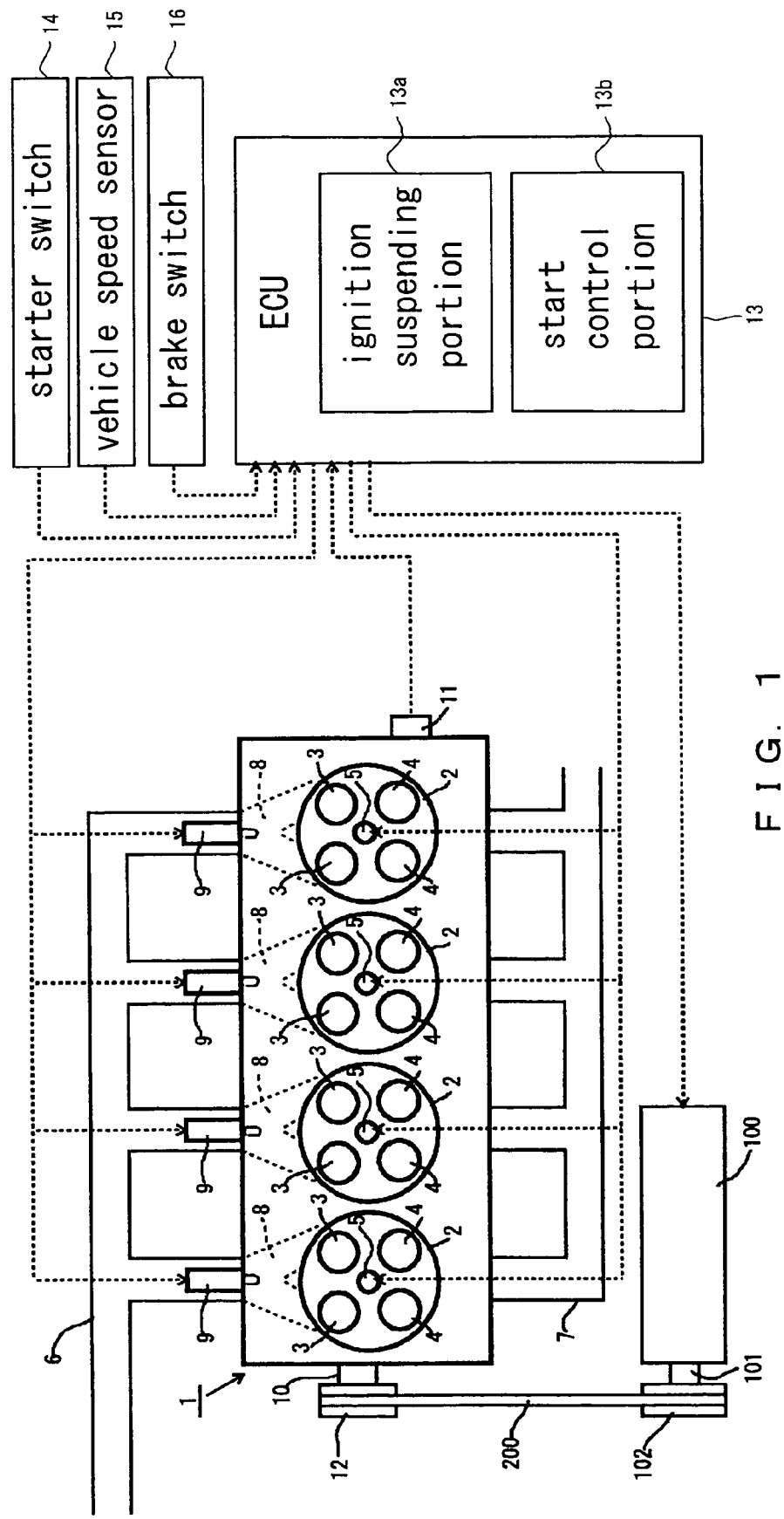
FIG. 1 schematically shows the structure of an internal combustion engine to which a first embodiment of the present invention is applied.
Figure 2:
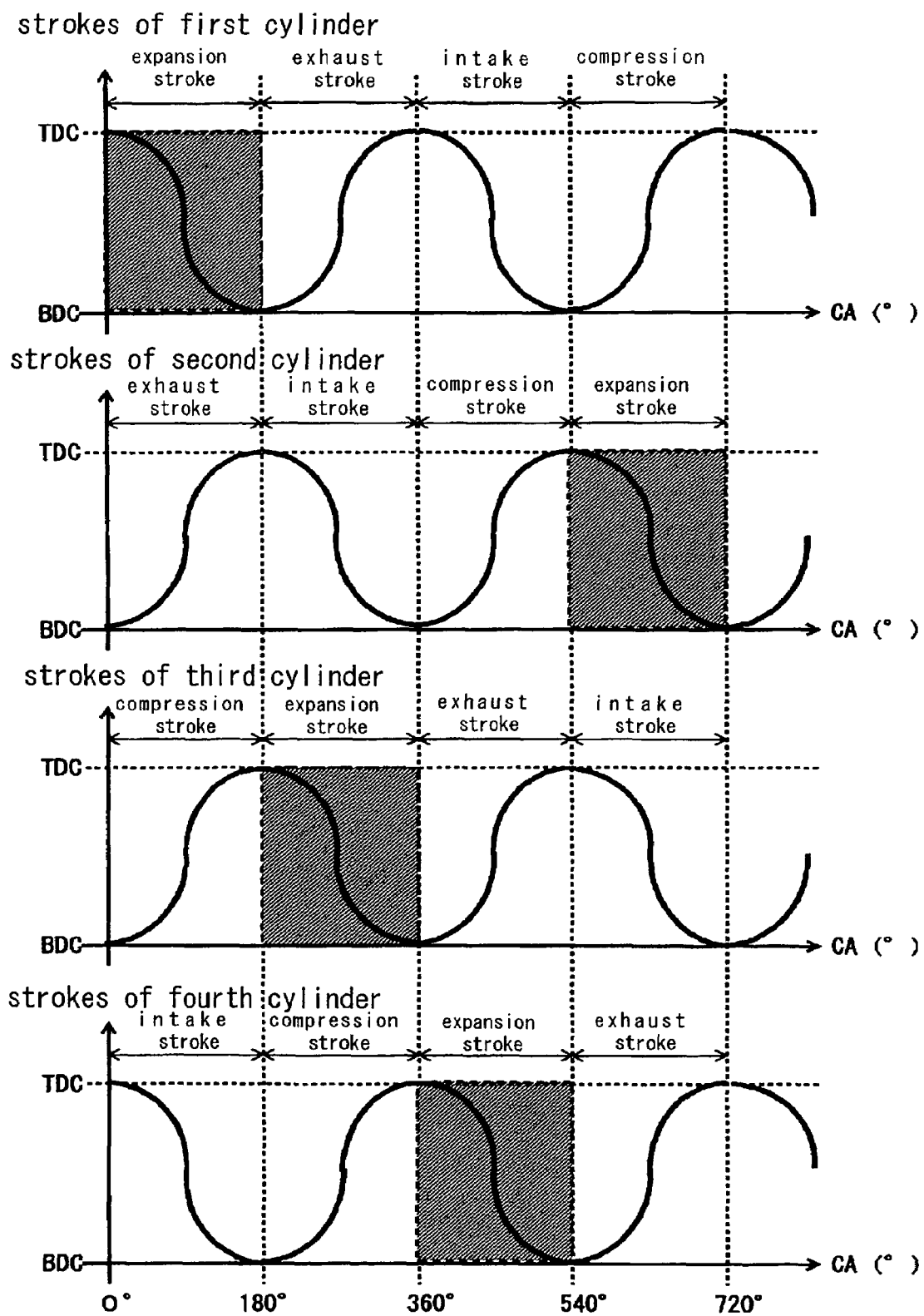
FIG. 2 shows the relationship between the crank angle and strokes of each cylinder.

FIG. 1 schematically shows an internal combustion engine to which the present invention is applied. The internal combustion engine 1 shown in FIG. 1 is a four-stroke cycle gasoline engine in which four cylinders 2 are arranged in a line.

Each of the cylinders 2 of internal combustion engine 1 is provided with an intake valve 3, an exhaust valve 4 and an ignition plug 5.

The internal combustion engine 1 is connected with an intake passage 6 and an exhaust passage 7. The intake passage 6 is in communication with each of the cylinders 2 of the internal combustion engine 1 via an intake port 8.

A fuel injection valve 9 is attached to each intake port 8. The fuel injection valve 9 can inject fuel in the interior of the intake port 8.

In addition, a crank position sensor 11 is attached to the internal combustion engine 1. The crank position sensor is adapted to output a pulse signal every time an engine output shaft (i.e. a crankshaft) 10 rotates by a predetermined angle (for example 10 degrees).

A crank pulley 12 is mounted on the crankshaft 10 of the internal combustion engine 1. The crank pulley 12 is connected with a motor pulley 102 fixed to the motor shaft 101 of a motor generator 100 by means of a belt 200.

For the internal combustion engine 1 having the above-described structure, there is additionally provided an electronic control unit (ECU) 13 for controlling the internal combustion engine 1. The ECU 13 is an arithmetic logical operation circuit composed of a CPU, a ROM, a RAM and a backup RAM etc.

In the ROM of the ECU 13, various programs for controlling the internal combustion engine 1 are stored. The programs include a stop control routine and a start control routine according to this embodiment that will be described later. The ROM of the ECU 13 also stores the ignition suspending portion 13a and the start control portion 13b as parts of the programs for controlling the internal combustion engine 1.

The ECU 13 is electrically connected with a starter switch 14, a vehicle speed sensor 15 and a brake switch 16 as well as the aforementioned crank position sensor 11 so that output signals of these portions are input to the ECU 13.

Furthermore, the ECU 13 is electrically connected with the ignition plugs 5, the fuel injection valves 9 and the motor generator 100 mentioned above, so that the ECU 13 can control the ignition plugs 5, the fuel injection valves 9 and the motor generator 100.

For example, when the internal combustion engine 1 is in the driving state and the electric load of the vehicle is higher than a predetermined value, when the internal combustion engine 1 is in the driving state and the remaining capacity of a battery (not shown) becomes smaller than a predetermined value, or when the internal combustion engine 1 is in a deceleration driving state, etc., the ECU 13 causes the motor generator 100 to function as a generator.

In this case, the rotational torque of the crankshaft 10 is transmitted to the motor shaft 101 via the crank pulley 12, the belt 200 and the motor pulley 102, so that the motor shaft 101 is rotated. The motor generator 100 generates electric power by converting the kinetic energy of the motor shaft 101 into electric energy.

On the other hand, upon starting the internal combustion engine 1, the ECU 13 causes the motor generator 100 to function as a motor.

In this case, as the motor generator 100 rotationally drives the motor shaft 101, the rotational torque of the motor shaft 101 is transmitted to the crankshaft 10 via the motor pulley 102, the belt 200 and the crank pulley 12, so that the crankshaft 10 is rotated.

Next, when the output signal of the brake switch 16 becomes ON and the output signal of the vehicle speed sensor 15 becomes "0" while the internal combustion engine 1 is in the driving state, in other words, when the vehicle is in the stopping state while the internal combustion engine 1 is in the driving state, the ECU 13 temporarily stops the operation of the ignition plugs 5 and the fuel injection valves 9 to stop the driving of the internal combustion engine 1 temporarily.

After that, when the output signal of the brake switch 16 changes from ON to OFF, the ECU 13 causes the motor generator 100 to operate as a starter motor and activates the ignition plugs 5 and the fuel injection valves 9 to start the internal combustion engine 1, to thereby restart the driving of the internal combustion engine 1.

By the way, in the case that starting and stopping of the internal combustion engine 1 is automatically switched as described above, it is necessary to start the internal combustion engine 1 quickly at the time when the output signal of the brake switch 16 is switched from ON to OFF.

However, when the internal combustion engine 1 is to be started, it is necessary for the motor generator 100 to rotate the crankshaft 10 while resisting the gas compression force in the cylinders 2 and the frictions in the internal combustion engine 1 etc. Consequently, there is a concern that the rated performance and power consumption of the motor generator 100 should become large in order to start the internal combustion engine 1 in a short time reliably.

In view of this, in the start control apparatus for an internal combustion engine according to this embodiment, the ECU 13 is adapted to carry out, upon starting the internal combustion engine 1, the start control that will be described in the following. Here, the description will be made with reference to an exemplary case in which the ignition in the internal combustion engine 1 is performed in the following order: the first cylinder 2—the third cylinder 2—the fourth cylinder 2—the second cylinder 2, and the rotational angle of the crankshaft 10 (which will be referred to as the crank angle hereinafter) becomes 0° (or 720°) when the first cylinder 2 is in the compression top dead center state.

In the start control according to this embodiment, the ECU 13 controls to supply unburned air-fuel mixture into the cylinder 2 that will be on the expansion stroke when the driving of the internal combustion engine 1 is stopped (such a cylinder will be referred to as "the expansion stroke cylinder upon stoppage 2" hereinafter) in advance.

Specifically, when the conditions for stopping the driving of the internal combustion engine 1 are met, the ECU 13 controls to suspend the operation of the ignition plugs 5 while continuing the operation of the fuel injection valves 9.

In this case, although the fuel injected from the fuel injection valves 9 is supplied into the cylinders 2 thanks to the continued operation of the fuel injection valves 9, the fuel supplied into the cylinders 2 is not ignited or burned, since the operation of the ignition plugs 5 has been suspended.

As a result, the internal combustion engine 1 does not generate a torque for rotating the crankshaft 10, and therefore the crankshaft 10 rotates only with an inertial force.

However, since the aforementioned inertial force is consumed by the gas compression force generated in the cylinder 2 on the compression stroke and frictions of various portions of the internal combustion engine 1, the rotation of the crankshaft 10 will stop after it has rotated several times since the operation of the ignition plugs 5 was suspended.

During the time period from when the operation of the ignition plugs 5 is suspended until the rotation of the crankshaft 10 stops (which time will be referred to as the time period required for engine stop hereinafter), fuel injected from the fuel injection valve 9 is taken into the cylinder 2 that is on the intake stroke together with air flowing in the intake port 8 to form air-fuel mixture.

As a result, unburned air-fuel mixture will be sealed in the interior of the cylinder (the expansion stroke cylinder upon stoppage) 2 that is in its expansion stroke at the time when the rotation of the crankshaft 10 stops.

Subsequently, when the conditions for starting the internal combustion engine 1 are met, the ECU 13 determines the aforementioned expansion stroke cylinder upon stoppage 2. The method for determining the expansion stroke cylinder upon stoppage 2 can be exemplified by determination of the expansion stroke cylinder upon stoppage 2 based on the crank angle at the time when the driving of the internal combustion engine 1 is stopped, or more specifically, at the time when the rotation of the crankshaft 10 stops (such a crank angle will be referred to as the crank angle upon stoppage hereinafter).

In connection with the above, in the internal combustion engine 1, when the crank angle is in the range of 0° to 180°, the first cylinder 2 is on the expansion stroke, when the crank angle is in the range of 180° to 360°, the third cylinder 2 is on the expansion stroke, when the crank angle is in the range of 360° to 540°, the fourth cylinder 2 is on the expansion stroke, and when the crank angle is in the range of 540° to 720°, the second cylinder 2 is on the expansion stroke.

Therefore, when the crank angle upon stoppage is in the range of 0° to 180°, the ECU 13 can determine that the first cylinder 2 is the expansion stroke cylinder upon stoppage 2, when the crank angle is in the range of 180° to 360°, the ECU 13 can determine that the third cylinder 2 is the expansion stroke cylinder upon stoppage 2, when the crank angle is in the range of 360° to 540°, the ECU 13 can determine that the fourth cylinder is the expansion stroke cylinder upon stoppage 2, and when the crank angle is in the range of 540° to 720°, the ECU can determine that the second cylinder 2 is the expansion stroke cylinder upon stoppage 2.

Having determined the expansion stroke cylinder upon stoppage 2 in this way, the ECU 13 causes the ignition plug 5 of the expansion stroke cylinder upon stoppage 2 to operate.

Alternatively, the ECU 13 may cause the ignition plugs 5 of all of the cylinders 2 to operate without determining the expansion stroke cylinder upon stoppage 2 at the time when the conditions for starting the internal combustion engine 1 are met.

In this case, the unburned air-fuel mixture sealed on the expansion stroke cylinder upon stoppage 2 will be ignited and burned, so that the crankshaft 10 will be rotated by the combustion pressure generated thereby. In other words, the cranking of the internal combustion engine 1 is carried out by combustion of the unburned air-fuel mixture in the interior of the expansion stroke cylinder upon stoppage 2.

Subsequently, the number of engine revolutions at the time of the cranking (which will be referred to as the number of revolutions upon cranking hereinafter) is calculated based on the output signal of the crank position sensor 11. More specifically, the ECU 13 calculates the number of revolutions upon cranking based on the time intervals at which the cranking position sensor 11 outputs signal pulses.

The ECU 13 determines whether or not the aforementioned number of revolutions upon cranking is equal to or larger than a predetermined number of revolutions. The predetermined number of revolutions mentioned above is, for example, substantially equal to or larger than the number of engine revolutions at the time when the motor generator 100 operates as a starter motor.

When the aforementioned number of revolutions upon cranking is equal to or larger than the aforementioned predetermined number of revolutions, the ECU 13 causes the ignition plugs 5 and the fuel injection valves 9 to operate without causing the motor generator 100 to operate as a motor.

In this case, the internal combustion engine is started without utilizing the power of the motor generator 100.

On the other hand, when the number of engine revolutions is smaller than the predetermined number of revolutions, the ECU 13 causes the ignition plugs 5 and the fuel injection valves 9 to operate while causing the motor generator to operate as a motor.

In this case, the internal combustion engine 1 is started utilizing the power of the motor generator 100. However, the load on the motor generator 100 is sufficiently lower than in the case that the unburned air-fuel mixture is not burned in the expansion stroke cylinder upon stoppage 2.

Figure 3:
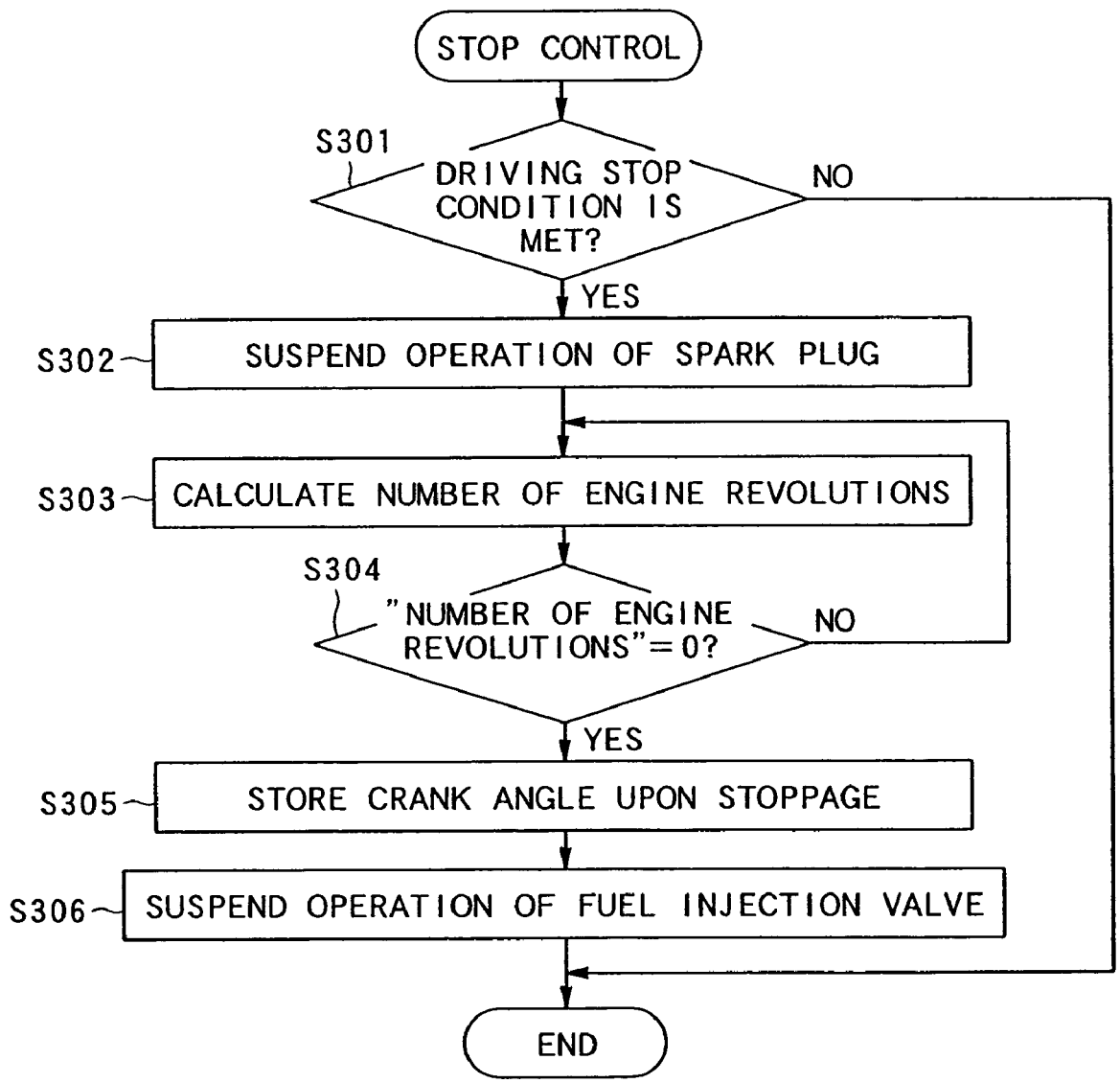
FIG. 3 is a flow chart of a stop control routine in a first embodiment.
Figure 4:
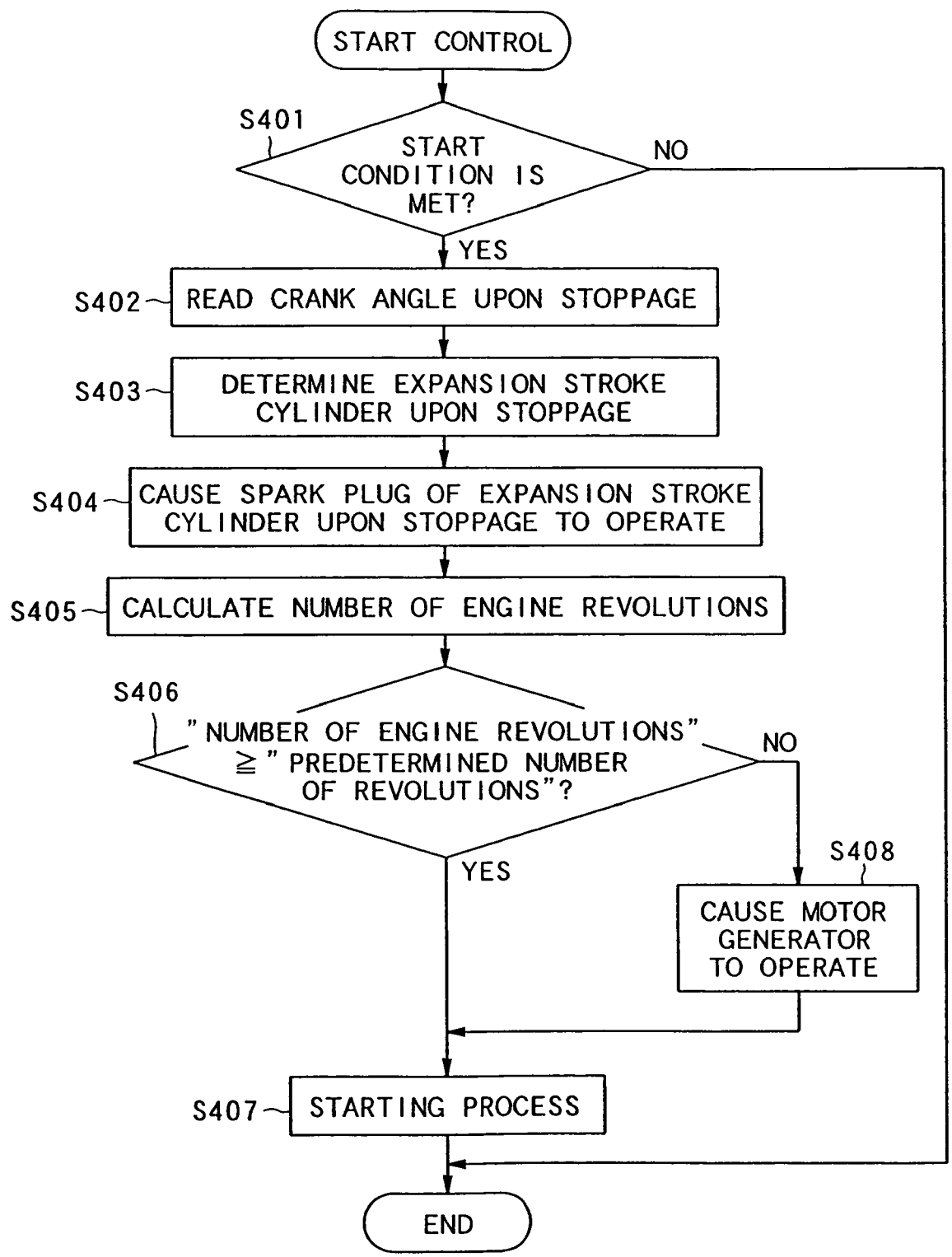
FIG. 4 is a flow chart of a start control routine in the first embodiment.

In the following, the start control process in the present embodiment will be described with reference to FIGS. 3 and 4. FIG. 3 is a flow chart of a stop control routine, and FIG. 4 is a flow chart of a start control routine.

The stop control routine is a routine executed by the ECU 13, triggered by the establishment of the driving stop conditions while the internal combustion engine 1 is driving. The start control routine is a routine executed by the ECU 13, triggered by the establishment of the driving start conditions while the internal combustion engine 1 is at rest.

In the stop control routine, the ECU 13 firstly determines, in step S301, whether or not the driving stop conditions for the internal combustion engine 1 are met. The driving stop conditions can be exemplified as follows: the output signal of the brake switch 16 is on; and the output signal of the vehicle speed sensor 15 is "0".

If it is determined in step S301 that the driving stop conditions are not met, the ECU 13 terminates the execution of this routine.

On the other hand, if it is determine in step S301 that the driving stop conditions are met, the process of the ECU 13 proceeds to step S302, and the ECU 13 suspends the operation of the ignition plugs 5. Namely, the ECU 13 suspends the operation of the ignition plugs 5 while maintaining the operation of the fuel injection valve 9.

In this case, although fuel injected from the fuel injection valve 9 is taken into the cylinder 2 that is on the intake stroke together with air flowing in the intake port 8 to form air-fuel mixture, the driving of the internal combustion engine is stopped, since the air-fuel mixture is not ignited or burned.

In step S303, the ECU 13 calculates the number of engine revolutions based on the output signal of the crank position sensor 11.

In step S304, the ECU 13 determines whether or not the number of engine revolutions calculated in the aforementioned step S303 is "0", in other words, whether or not the rotation of the crankshaft 10 has stopped.

If it is determined in step S304 that the number of engine revolutions is not "0", the ECU 13 assumes that the rotation of the crankshaft 10 has not stopped, and executes the process of the aforementioned steps S303 and S304 again.

On the other hand, if it is determined in step S304 that the number of engine revolutions is "0", the ECU 13 assumes that the rotation of the crankshaft 10 has stopped, and the process proceeds to step S305.

In step S305, the ECU 13 stores the crank angle at the time when the rotation of the crankshaft 10 stopped (i.e. the crank angle upon stoppage) in the backup RAM.

In step S306, the ECU13 suspends the operation of the fuel injection valves 9 and terminates the execution of this routine.

As per the above, with the execution of the stop control routine by the ECU 13, air-fuel mixture is supplied to each of the cylinders 2 of the internal combustion engine 1 during the time period (the time period required for engine stop) from when the operation of the ignition plugs 5 is suspended until the rotation of the crankshaft 10 stops. Consequently, unburned air-fuel mixture is sealed in the interior of the cylinder (the expansion stroke cylinder upon stoppage) 2 that is on the expansion stroke at the time when the rotation of the crankshaft 10 stops.

Subsequently, when the conditions for starting the internal combustion engine 1 are met, the ECU 13 will execute the start control routine shown in FIG. 4. In the start control routine, the ECU 13 firstly determines, in step S401, whether or not the start conditions for the internal combustion engine 1 are met. The start condition mentioned above may be exemplified by switching of the brake switch 16 from ON to OFF and switching of the starter switch 14 from OFF to ON.

If it is determined in step S401 that the start conditions are not met, the ECU 13 terminates the execution of this routine.

On the other hand, if it is determined in step S401 that the start conditions are met, the process of the ECU 13 proceeds to step S402, and the ECU 13 reads out the crank angle upon stoppage from the backup RAM.

In step S403, the ECU 13 determines the expansion stroke cylinder upon stoppage 2 based on the aforementioned crank angle upon stoppage. In doing so, when the crank angle upon stoppage is in the range of 0° to 180°, the ECU 13 determines that the first cylinder 2 is the expansion stroke cylinder upon stoppage 2, when the crank angle is in the range of 180° to 360°, the ECU 13 determines that the third cylinder 2 is the expansion stroke cylinder upon stoppage 2, when the crank angle is in the range of 360° to 540°, the ECU 13 determines that the fourth cylinder 2 is the expansion stroke cylinder upon stoppage 2, and when the crank angle is in the range of 540° to 720°, the ECU 13 determines that the second cylinder 2 is the expansion stroke cylinder upon stoppage 2.

In step S404, the ECU 13 activates the ignition plug 5 of the expansion stroke cylinder upon stoppage 2 determined in the aforementioned step S403.

On that occasion, the unburned air-fuel mixture sealed in the interior of the expansion stroke cylinder upon stoppage 2 is ignited and burned, whereby combustion pressure is generated to act so as to rotate the crankshaft 10. Thus, the crankshaft 10 is rotated without utilizing the power of the motor generator 100. In other words, the cranking of the internal combustion engine 1 is achieved by the combustion of the air-fuel mixture in the interior of the expansion stroke cylinder upon stoppage 2.

In step S405, the ECU 13 calculates the number of revolutions of the cranking based on the output signal of the crank position sensor 11.

In step S406, the ECU 13 determines whether or not the number of revolutions of the cranking calculated in the aforementioned step S405 is equal to or larger than a predetermined number of revolutions.

If it is determined in the aforementioned step S406 that the aforementioned number of revolutions of the cranking is equal to or larger than the predetermined number of revolutions, the process of the ECU 13 proceeds to step S407, in which the starting process is carried out. In the starting process, the ECU 13 causes the ignition plugs 5 and the fuel injection valves 9 to operate in a manner similar to the process in the normal starting.

In this case, the internal combustion engine 1 is started without utilizing the power of the motor generator 100.

On the other hand, if it is determined in the aforementioned step S406 that the aforementioned number of revolutions of the cranking is smaller than the predetermined number of revolutions, the ECU 13 causes, in step S408, the motor generator 100 to operate as a motor, and subsequently executes the process of step S407.

In this case, the internal combustion engine 1 is started by utilizing the combustion pressure generated upon combustion of the unburned air-fuel mixture in the interior of the expansion stroke cylinder upon stoppage 2 and the power of the motor generator 100.

Here, the process of steps S402 to S404 constitutes the start control portion 13b in this embodiment.

As per the above, with the execution of the start control routine by the ECU 13, the cranking of the internal combustion engine 1 can be achieved utilizing the combustion pressure generated upon combustion of the unburned air-fuel mixture in the interior of the expansion stroke cylinder upon stoppage 2. Therefore, with the start control apparatus for an internal combustion engine according to the present embodiment, it is possible, in a port injection type internal combustion engine, to reduce the load on the motor generator 100 at the time of starting the engine.

Although in the start control in this embodiment, the fuel injection valves 9 are caused to operate during the time period required for engine stop, it is preferable that the operation of the fuel injection valves 9 is suspended during the time period from when the operation of the ignition plugs 5 is suspended until the number of engine revolutions decreases to some degree within the time period required for engine stop.

Figure 5:
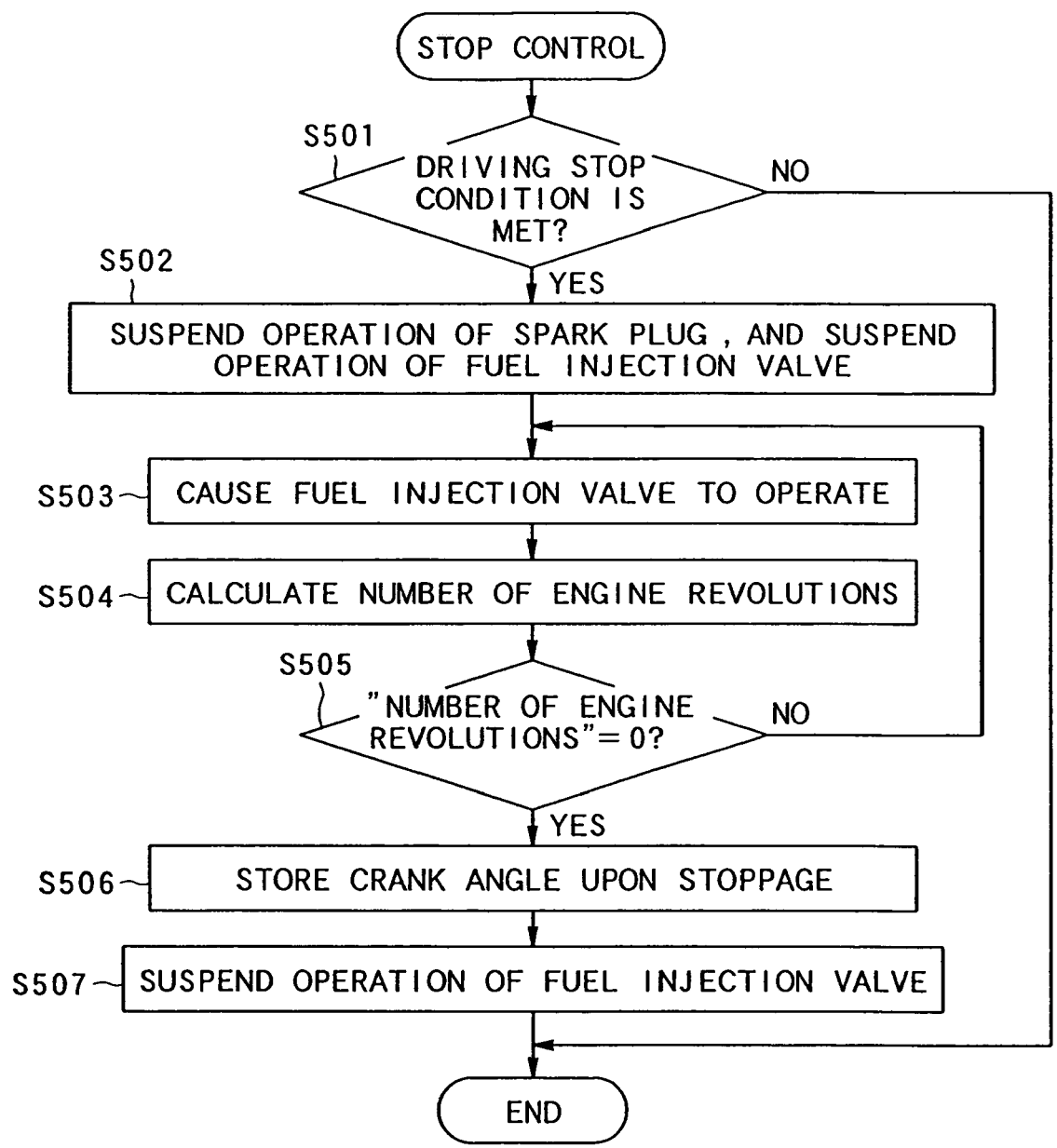
FIG. 5 is a flow chart of a different mode of the stop control routine in the first embodiment.

FIG. 5 is a flow chart of a more preferable mode of the stop control routine in this embodiment.

In the stop control routine shown in FIG. 5, the ECU 13 firstly determines, in step S501, whether or not the driving stop conditions are met. This process is the same as the process of step S301 in the flow chart shown in FIG. 3. If it is determined in step S501 that the driving stop conditions are met, the process of the ECU 13 proceeds to step S502, and the ECU 13 suspends the operation of both the ignition plugs 5 and the fuel injection valves 9.

In this case, since the driving of the internal combustion engine 1 is stopped, the revolution speed of the crankshaft 10 of the internal combustion engine 1 gradually decreases.

In step S503, the fuel injection valves 9 is caused to operate, so that air-fuel mixture is formed in the cylinder 2 that is on the intake stroke together with air flowing in the intake port 8. It should be noted that since the operation of the ignition plugs 5 is suspended at that time, the air-fuel mixture is not ignited or burned and the number of engine revolutions continues to decrease.

In connection with the above process, there may be a predetermined time interval since the process of the ECU 13 proceeds to step S503 until the fuel injection valves 9 are actually caused to operate. This predetermined time interval may be determined in advance by experiments in relation to the number of engine revolutions at the time when the process of step S502 is executed as the time required for so decreasing the number of engine revolutions of the internal combustion engine 1 that the engine is about to stop.

Next in step S504, the ECU 13 calculates the number of engine revolutions based on the output signal of the crank position sensor 11.

In step S505, the ECU 13 determines whether or not the number of engine revolutions calculated in the above step S504 is "0" (zero), namely whether or not the rotation of the crankshaft 10 has stopped.

If it is determined in step S505 that the number of engine revolutions is not "0", the ECU 13 assumes that the rotation of the crankshaft 10 has not stopped, and executes the process of the aforementioned steps S503 to S505 again.

On the other hand, if it is determined in step S505 that the number of engine revolutions is "0", the ECU 13 assumes that the rotation of the crankshaft 10 has stopped, and the process proceeds to step S506.

In step S506, the ECU 13 stores the crank angle at the time when the rotation of the crankshaft 10 stopped (i.e. the crank angle upon stoppage) in the backup RAM.

In step S507, the ECU13 suspends the operation of the fuel injection valves 9 and terminates the execution of this routine. When the ECU 13 executes the stop control routine in accordance with the mode shown in FIG. 5 of this embodiment, air-fuel mixture is not formed in each cylinder 2 of the internal combustion engine 1 for a predetermined period after the time when the operation of the fuel injection valves 9 and the ignition plugs 5 is suspended, and air-fuel mixture is supplied to each cylinder of the internal combustion engine 1 just before the rotation of the crankshaft 10 stops.

Consequently, it is possible to prevent the fuel supplied from the fuel injection valve 9 from being not staying in the cylinder but exhausted.

The above process of S502 and S503 constitutes the ignition suspending portion 13a in this embodiment.

Here, in the start control according to this embodiment, only the cylinder that is on the expansion stroke at the time when the driving of the internal combustion engine 1 stops (i.e. the expansion stroke cylinder upon stoppage) is determined and starting of the internal combustion engine 1 is designed to be achieved by burning the air-fuel mixture in the interior of that expansion stroke cylinder upon stoppage. However, the start control may be modified in such a way that the cylinder 2 that is on the compression stroke at the time when the driving of the internal combustion engine stops (such a cylinder will be referred to as the compression stroke cylinder upon stoppage 2 hereinafter) is determined in addition to the cylinder that is on the expansion stroke (the expansion stroke cylinder upon stoppage), and the air-fuel mixture in the interior of the expansion stroke cylinder upon stoppage is burned firstly and the air-fuel mixture in the interior of the compression stroke cylinder upon stoppage is also burned subsequently at the time when the compression stroke cylinder upon stoppage gets on the expansion stroke.

In this case, the load on the motor generator 100 can be reduced further, since the cranking of the internal combustion engine 1 is achieved utilizing the combustion pressure generated upon combustion of the unburned air-fuel mixture in the interior of the compression stroke cylinder upon stoppage in addition to the combustion pressure generated upon combustion of the unburned air-fuel mixture in the interior of the expansion stroke cylinder upon stoppage.

[Embodiment 2]

Next, a second embodiment of the start control apparatus for an internal combustion engine according to the present invention will be described with reference to FIGS. 6 to 8. In the following, the structures that are different from those in the first embodiment will be described, and descriptions of the same structures will be omitted.

The difference between this embodiment and the above-described first embodiment is that while in the above-described first embodiment the fuel injection valves 9 of all of the cylinders 2 are caused to operate during the time period required for engine stop, in this embodiment the expansion stroke cylinder upon stoppage 2 is estimated and only the fuel injection valve 9 of the estimated expansion stroke cylinder upon stoppage 2 is caused to operate during the time period required for engine stop.

Figure 6:
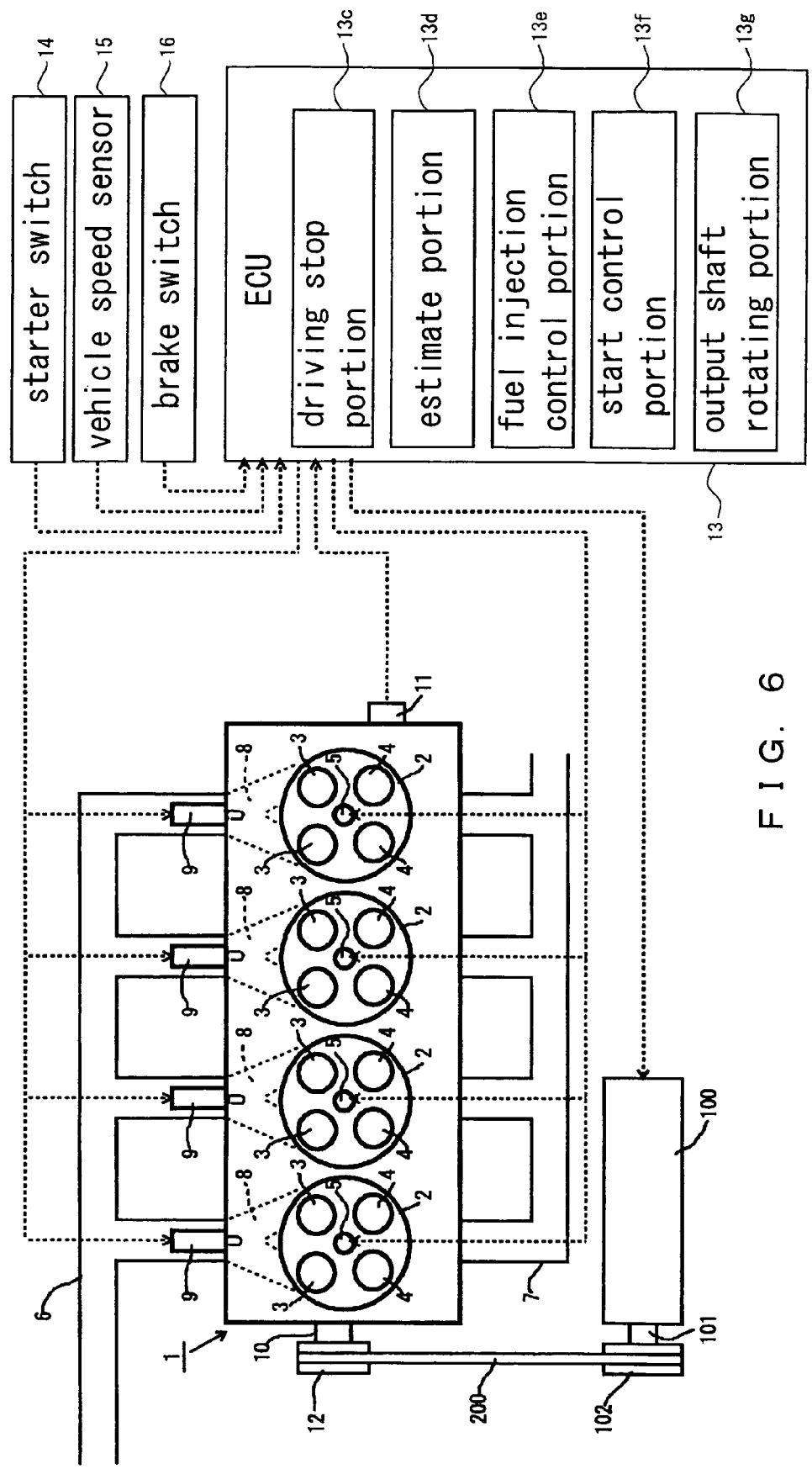
FIG. 6 schematically shows the structure of an internal combustion engine to which a second embodiment of the present invention is applied.

As shown in FIG. 6, in the ECU 13, a driving stop portion 13c, an estimate portion 13d, a fuel injection control portion 13e, a start control portion 13f and an output shaft rotating portion 13g are stored as parts of the programs for controlling the internal combustion engine 1.

In the following, the start control according to this embodiment will be described with reference to FIG. 7 and FIG. 8.

Figure 7:
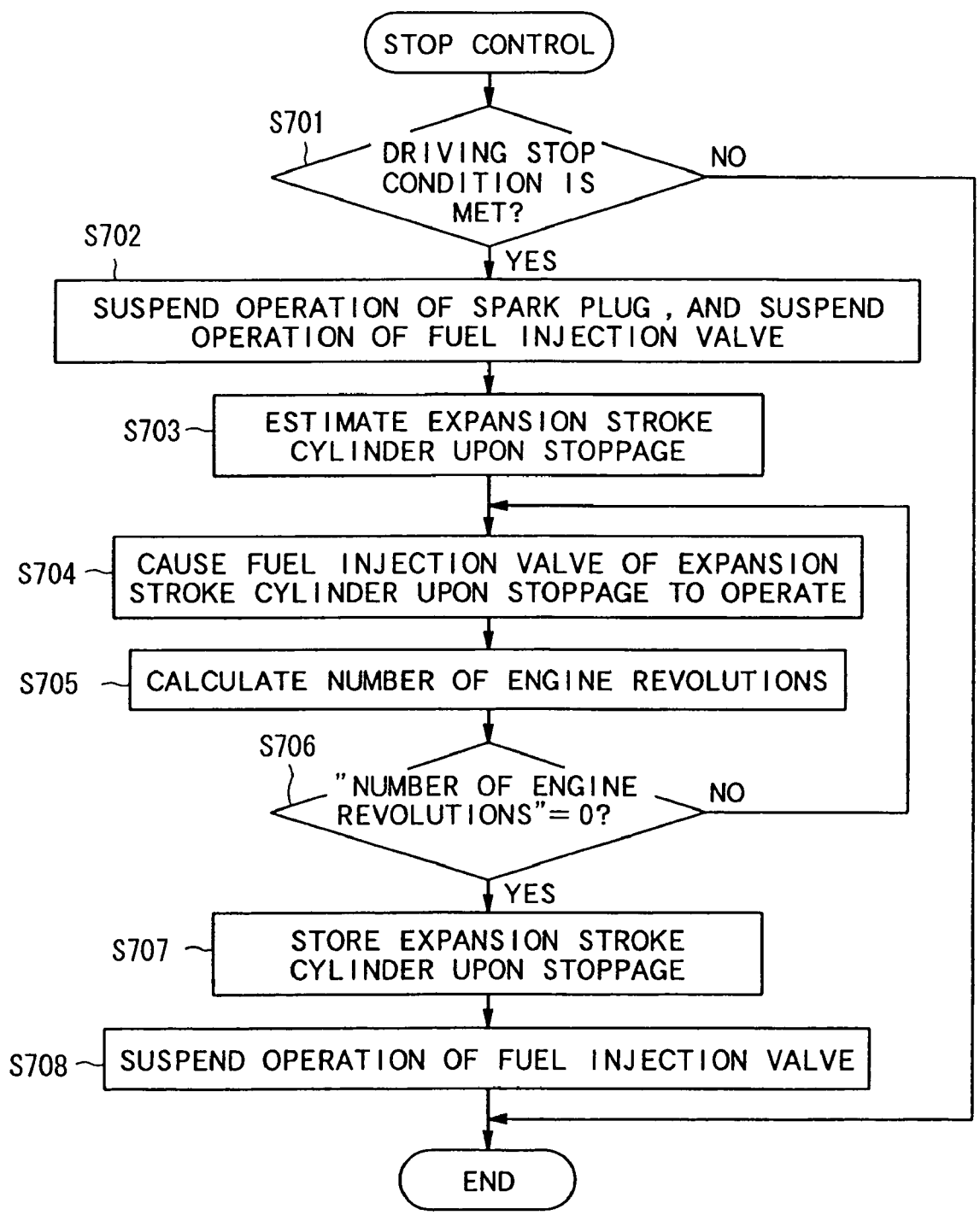
FIG. 7 is a flow chart of a stop control routine in a second embodiment.
Figure 8:
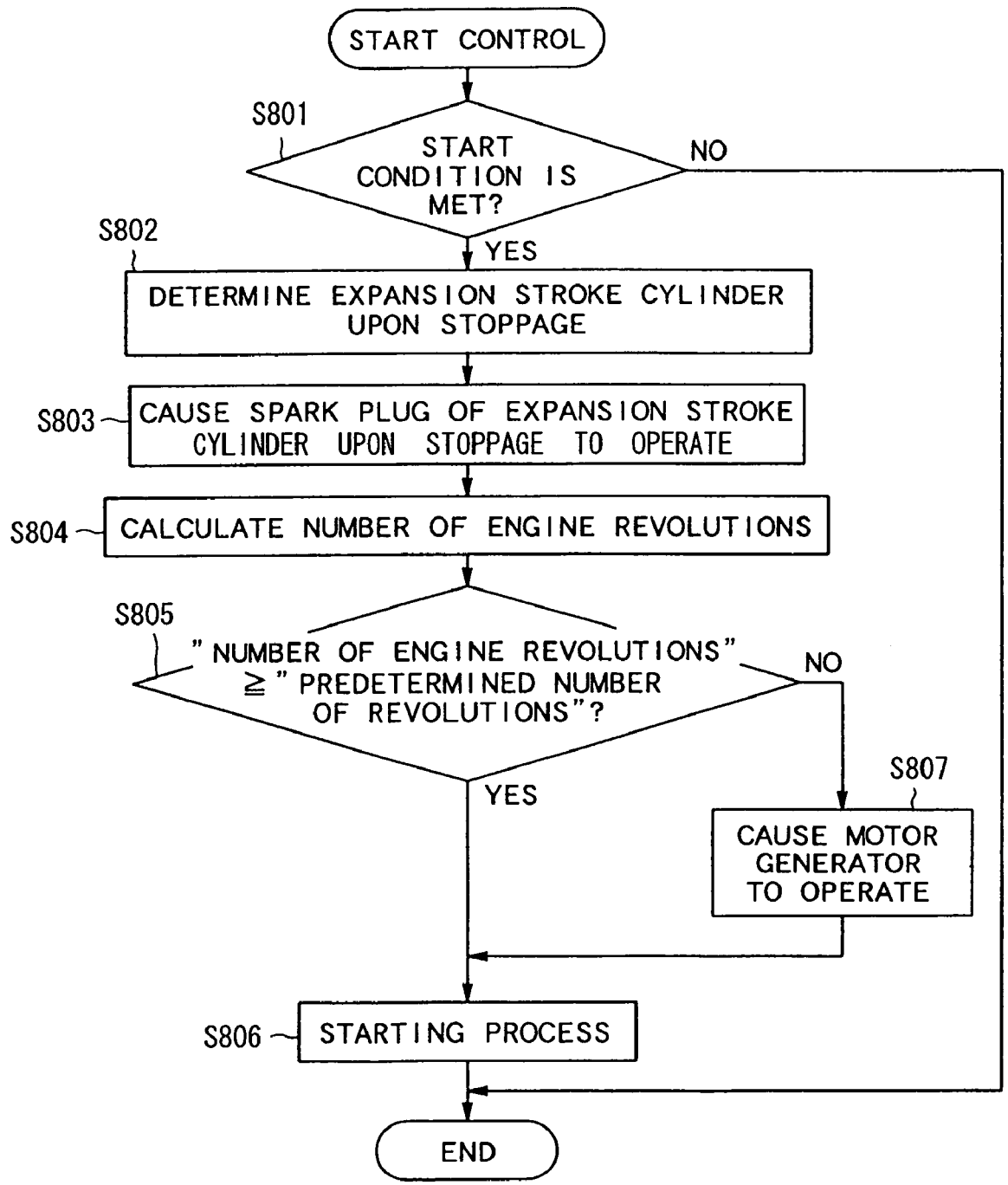
FIG. 8 is a flow chart of a start control routine in the second embodiment.

FIG. 7 is a flow chart of a stop control routine in this embodiment, and FIG. 8 is a flow chart of a start control routine in this embodiment.

The aforementioned stop control routine is a routine executed by the ECU 13, triggered by the establishment of the stop conditions while the internal combustion engine 1 is in the driving state as is the case with the stop control routine in the above-described first embodiment, and the aforementioned start control routine is a routine executed by the ECU 13, triggered by the establishment of the start conditions while the internal combustion engine 1 is at rest as is the case with the start control routine in the above-described first embodiment.

In the stop control routine, the ECU 13 firstly determines, in step S701, whether or not the driving stop conditions for the internal combustion engine 1 are met.

If it is determined in step S701 that the driving stop conditions are not met, the ECU 13 terminates the execution of this routine.

On the other hand, if it is determine in step S701 that the driving stop conditions are met, the process of the ECU 13 proceeds to step S702, and the ECU 13 suspends the operation of the ignition plugs 5 and the operation of the fuel injection valves 9.

In this case, the rotation speed of the crankshaft 10 will gradually decrease, since the fuel is not burned in the cylinders 2 of the internal combustion engine 1.

In step S703, the ECU 13 estimates the expansion stroke cylinder upon stoppage 2. The method for estimating the expansion stroke cylinder upon stoppage 2 can be exemplified by a method of estimating the crank angle upon stoppage using as a parameter a crank angle at the time when the number of engine revolutions decreases dawn to a specific number of revolutions during the time period required for engine stop, in other words, at the time when the rotational speed of the engine decreases down to a specific rotational speed during the time period required for engine stop.

In this process, the relationship between the crank angle at the time when the number of engine revolutions decreases down to the specific number of revolutions and the crank angle upon stoppage may be obtained in advance by an experiment and the relationship may be represented as a map.

In addition, since frictions acting in the internal combustion engine 1 during the time period required for engine stop vary depending on the temperature of lubricant or the temperature of cooling water etc., the crank angle upon stoppage may be estimated using the temperature of the lubricant and the temperature of the cooling water as parameters in addition to the crank angle at the time when the number of engine revolutions decreases down to the specific number of revolutions.

In step S704, the ECU 13 activates the fuel injection valve 9 of the expansion stroke cylinder upon stoppage 2 estimated in the aforementioned step S703.

In step S705, the ECU 13 calculates the number of engine revolutions based on the output signal of the crank position sensor 11.

In step S706, the ECU 13 determines whether or not the number of engine revolutions calculated in the aforementioned step S705 is "0", namely whether or not the rotation of the crankshaft 10 has stopped.

If it is determined in the aforementioned step S706 that the number of engine revolutions is not "0", the ECU 13 executes the process of the aforementioned steps S704 to S706 again.

If it is determined in the aforementioned step S706 that the number of engine revolutions is "0", the ECU 13 assumes that the rotation of the crankshaft 10 has stopped, and the process proceeds to step S707.

In step S707, the ECU 13 stores information for identifying the expansion stroke cylinder upon stoppage 2 estimated in the aforementioned step S703 in the backup RAM.

In step S708, the ECU 13 suspends the operation of the fuel injection valve 9 of the expansion stroke cylinder upon stoppage 2 to finish the execution of this routine.

As per the above, with the execution of the stop control routine by the ECU 13, it is possible to seal unburned air-fuel mixture in the interior of the expansion stroke cylinder upon stoppage 2.

In the stop control routine according to this embodiment, the process of step S702 constitutes the driving stop portion 13c, the process of step S703 constitutes the estimate portion 13d, and the process of step S704 constitutes the fuel injection control portion 13e.

Subsequently, when the conditions for starting the internal combustion engine 1 are met, the ECU 13 executes the start control routine shown in FIG. 8. In the start control routine, the ECU 13 firstly determines in step S801, whether or not the start conditions for the internal combustion engine 1 are met.

If it is determined in step S801 that the start conditions are not met, the ECU 13 terminates the execution of this routine.

On the other hand, if it is determined in step S801 that the start conditions are met, the process of the ECU 13 proceeds to step S802, and the ECU 13 reads out information for identifying the expansion stroke cylinder upon stoppage 2 from the backup RAM and determines the expansion stroke cylinder upon stoppage 2 based on the identification information.

In step S803, the ignition plug 5 of the expansion stroke cylinder upon stoppage 2 determined in the aforementioned step S802 is caused to operate.

On that occasion, the unburned air-fuel mixture sealed in interior of the expansion stroke cylinder upon stoppage 2 is ignited and burned, whereby combustion pressure is generated to act so as to rotate the crankshaft 10. Thus, the crankshaft 10 is rotated without utilizing the power of the motor generator 100. In other words, the cranking of the internal combustion engine 1 is achieved by the combustion of the air-fuel mixture in the interior of the expansion stroke cylinder upon stoppage 2.

The process of steps S804 to S807 is the same as the process of steps S405 to S408 of the start control routine in the above-described first embodiment.

As per the above, with the execution of the start control routine by the ECU 13, the cranking of the internal combustion engine 1 can be achieved utilizing the combustion pressure generated upon combustion of the unburned air-fuel mixture in the interior of the expansion stroke cylinder upon stoppage 2.

Therefore, according to the start control apparatus for an internal combustion engine according to this embodiment, the advantageous effects same as the above-described first embodiment can be achieved. Furthermore, since in the start control apparatus for an internal combustion engine according to this embodiment, the operation of the fuel injection valve 9 of only the expansion stroke cylinder upon stoppage 2 is caused to operate during the time period in which the number of engine revolutions changes from the specific number of revolutions to "0" within the time period required for engine stop, the fuel consumption can be reduced as compared to the start control apparatus for an internal combustion engine according to the above-described first embodiment.

In the start control routine of this embodiment, the process of step S803 constitutes the start control portion 13f.

In addition, in case that the rotation of the crankshaft 10 stops in the state in which the expansion stroke cylinder upon stoppage 2 is on the compression stroke preceding the expansion stroke upon stoppage of the driving of the internal combustion engine 1, the ECU 13 may be adapted in such a way as to cause the motor generator 100 to operate to rotate the crankshaft 10 until the expansion stroke cylinder upon stoppage 2 gets on the expansion stroke.

Specifically, the ECU 13 determines, upon stoppage of the driving of the internal combustion engine 1 or upon the next start of the internal combustion engine 1, whether the expansion stroke cylinder upon stoppage 2 is on the compression stroke or on the expansion stroke based on the crank angle upon stoppage.

If it is determined that the expansion stroke cylinder upon stoppage 2 is on the expansion stroke, the ECU 13 executes, upon the next start of the internal combustion engine 1, the start control routine as described with reference to FIG. 8 to start the internal combustion engine 1.

On the other hand, if it is determined that the expansion stroke cylinder upon stoppage 2 is on the compression stroke, the ECU 13 causes the motor generator 100 to operate until the aforementioned expansion stroke cylinder upon stoppage 2 gets on the expansion stroke, upon stoppage of the driving of the internal combustion engine 1 or upon the next start of the internal combustion engine 1. Furthermore, the ECU 13 causes to ignition plug 5 of the expansion stroke cylinder upon stoppage 2, upon the next start of the internal combustion engine 1.

In this case, although the motor generator 100 is caused to operate until the expansion stroke cylinder upon stoppage 2 shifts from the compression stroke to the expansion stroke, the operating time of the motor generator 100 on that occasion is very short as compared to the case in which the cranking is achieved by the motor generator 100 alone. In addition, after the expansion stroke cylinder upon stoppage 2 gets on the expansion stroke, the cranking of the internal combustion engine 1 can be achieved by combustion of the unburned air-fuel mixture in the interior of the expansion stroke cylinder upon stoppage 2. Therefore, the load on the motor generator 100 upon starting the engine can be reduced.

In connection with the above, the process that the motor generator 100 is caused to operate until the aforementioned expansion stroke cylinder upon stoppage 2 gets on the expansion stroke upon stoppage of the driving of the internal combustion engine 1 or upon the next start of the internal combustion engine 1 constitutes the output shaft rotating portion 13g in this embodiment.

In addition, although in the stop control in this embodiment, the ECU 13 estimates the expansion stroke cylinder upon stoppage 2 during the time period required for engine stop and seals unburned air-fuel mixture in the interior of that expansion stroke cylinder upon stoppage, the ECU 13 may be adapted in such a way as to estimate the cylinder 2 that will be on the compression stroke upon stoppage of the driving of the internal combustion engine 1 (such a cylinder will be referred to as the compression stroke cylinder upon stoppage 2 hereinafter) and to seal unburned air-fuel mixture in the interior of that compression stroke cylinder upon stoppage 2.

In this case, in the start control, the ECU 13 causes the ignition plug 5 of the compression stroke cylinder upon stoppage 2 to operate after causing the motor generator 100 to operate until the compression stroke cylinder upon stoppage 2 gets on the expansion stoke.

When the above-described stop control and start control are carried out, although the motor generator 100 is caused to operate until the compression stroke cylinder upon stoppage 2 shifts from the compression stroke to the expansion stroke, the operating time of the motor generator 100 on that occasion is very short as compared to the case in which the cranking is achieved by the motor generator 100 alone. In addition, after the expansion stroke cylinder upon stoppage 2 gets on the expansion stroke, the cranking of the internal combustion engine 1 can be achieved by combustion of the unburned air-fuel mixture in the interior of the expansion stroke cylinder upon stoppage 2. Therefore, the load on the motor generator 100 upon starting the engine can be reduced.

Furthermore, in the stop control in this embodiment, the ECU 13 estimates the expansion stroke cylinder upon stoppage 2 during the time period required for engine stop and seals unburned air-fuel mixture in the interior of that expansion stroke cylinder upon stoppage 2, the ECU 13 may be adapted in such a way as to estimate the cylinder 2 (i.e. the compression stroke cylinder upon stoppage 2) that will be on the compression stroke in addition to the cylinder 2 (the expansion stroke cylinder upon stoppage 2) that will be on the expansion stroke upon stoppage of the driving of the internal combustion engine 1 and to seal unburned air-fuel mixture in the interior of the expansion stroke cylinder upon stoppage 2 and the compression stroke cylinder upon stoppage 2.

In this case, in the start control, the ECU 13 firstly causes the ignition plug 5 of the expansion stroke cylinder upon stoppage 2 to operate to rotate the crankshaft 10, and subsequently causes the ignition plug 5 of the compression stroke cylinder upon stoppage at the time when the compression stroke cylinder upon stoppage 2 gets on the expansion stroke.

When the above-described stop control and the start control are carried out, the cranking of the internal combustion engine 1 can be achieved utilizing the combustion pressure generated upon combustion of the unburned air-fuel mixture in the interior of the compression stroke cylinder upon stoppage 2 in addition to the combustion pressure generated upon combustion of the air-fuel mixture in the interior of the expansion stroke cylinder upon stoppage 2. Therefore, the load on the motor generator 100 upon starting the engine can be further reduced.

[Embodiment 3]

Next, a third embodiment of the start control apparatus for an internal combustion engine according to the present invention will be described with reference to FIGS. 9 to 11. In the following, the structures that are different from those in the first embodiment will be described, and descriptions of the same structures will be omitted.

The difference between this embodiment and the above-described first embodiment is that while in the above-described first embodiment the fuel injection valves 9 of all of the cylinders 2 are operated during the time period required for engine stop so that unburned air-fuel mixture is sealed in the interior of the cylinder 2 that is on the expansion stroke when the rotation of the crankshaft 10 stops, in this embodiment the fuel injection valve 9 of a specific cylinder 2 is caused to operate just before the rotation of the crankshaft 10 stops and the rotation of the crankshaft 10 is stopped at the time when the aforementioned specific cylinder 2 gets on the expansion stroke.

Figure 9:
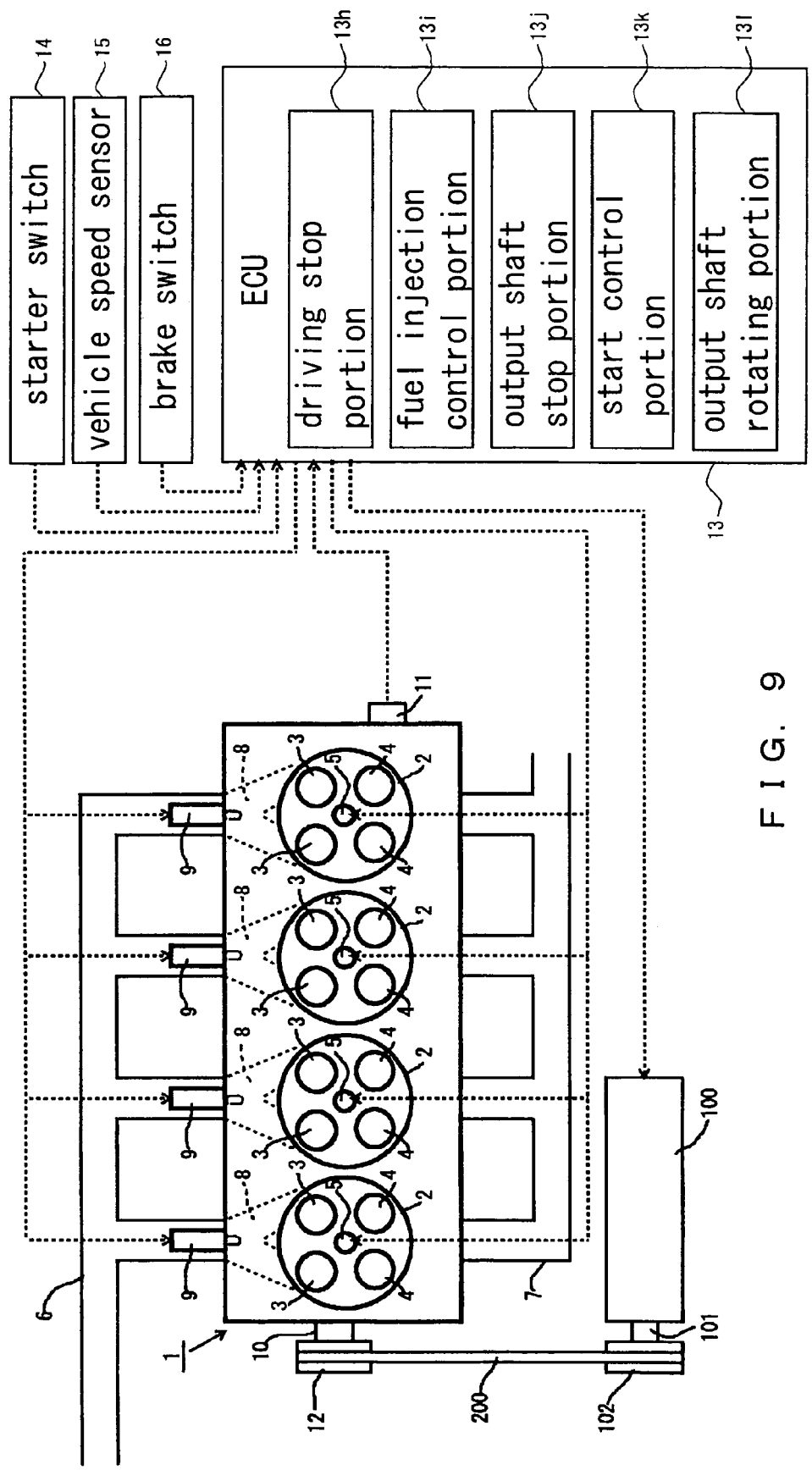
FIG. 9 schematically shows the structure of an internal combustion engine to which a third embodiment of the present invention is applied.

As shown in FIG. 9, in the ECU 13, a driving stop portion 13h, a fuel injection control portion 13i, an output shaft stop portion 13j, a start control portion 13k and an output shaft rotating portion 131 are stored as parts of the programs for controlling the internal combustion engine 1.

In the following, the start control in this embodiment will be described with reference to FIGS. 10 and 11.

Figure 10:
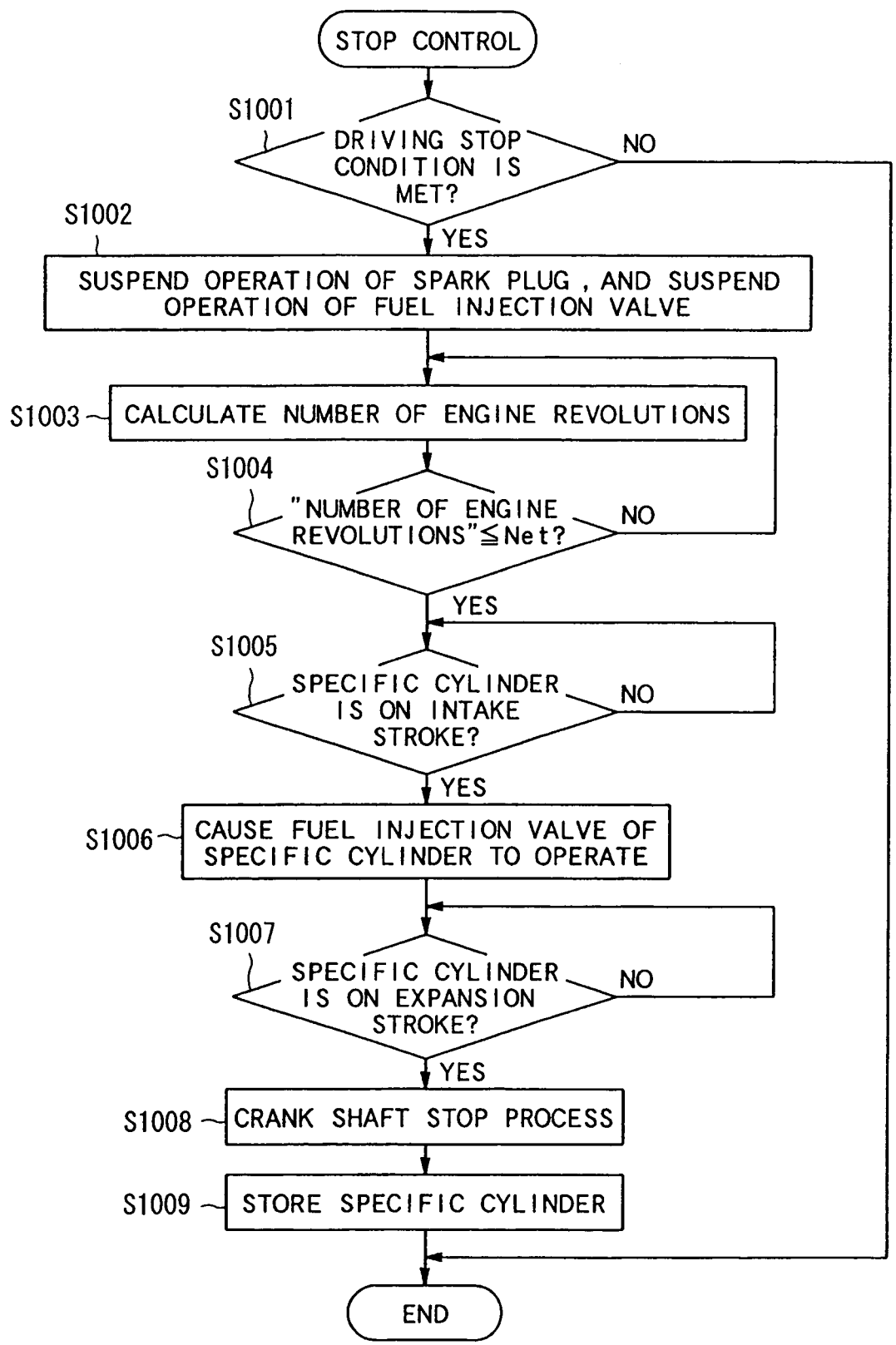
FIG. 10 is a flow chart of a stop control routine in the third embodiment.
Figure 11:
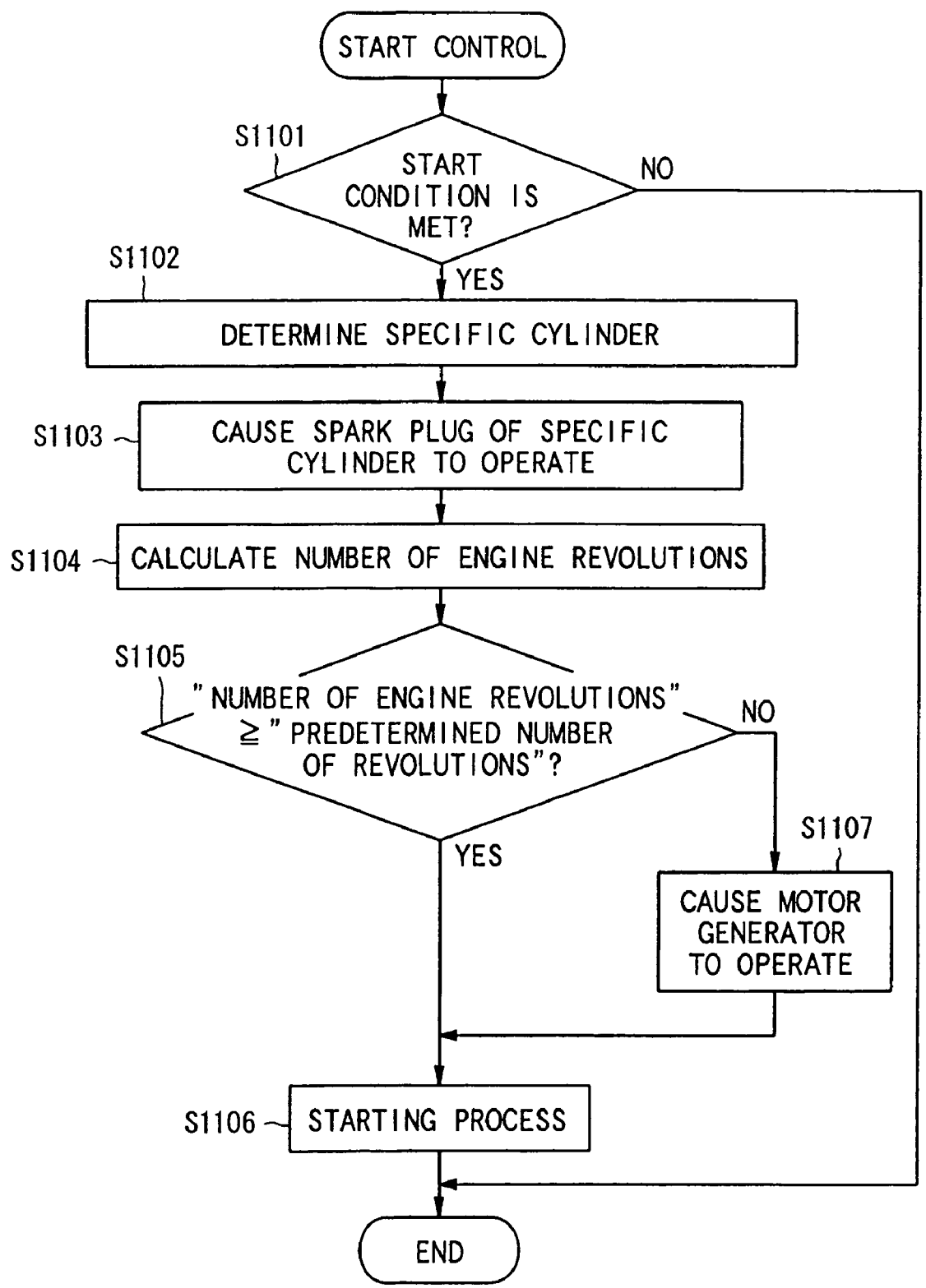
FIG. 11 is a flow chart of a start control routine in the third embodiment.

FIG. 10 is a flow chart of a stop control routine in this embodiment, and FIG. 11 is a flow chart of a start control routine in this embodiment.

The aforementioned stop control routine is a routine executed by the ECU 13, triggered by the establishment of the stop conditions while the internal combustion engine is in the driving state as is the case with the stop control routine in the above-described first embodiment, and the aforementioned start control routine is a routine executed by the ECU 13, triggered by the establishment of the start conditions while the internal combustion engine 1 is at rest as is the case with the start control routine in the above-described first embodiment.

In the stop control routine, the ECU 13 firstly determines, in step S1001, whether or not the driving stop conditions for the internal combustion engine 1 are met.

If it is determined in step S1001 that the driving stop conditions are not met, the ECU 13 terminates the execution of this routine.

On the other hand, if it is determine in step S1001 that the driving stop conditions are met, the process of the ECU 13 proceeds to step S1002, and the ECU 13 suspends the operation of the ignition plugs 5 and the operation of the fuel injection valves 9.

In this case, the rotation speed of the crankshaft 10 will gradually decrease, since the fuel is not burned in the cylinders 2 of the internal combustion engine 1.

In step S1003, the ECU 13 calculates the number of engine revolutions based on the output signal of the crank position sensor 11.

In step S1004, the ECU 13 determines whether the number of engine revolutions calculated in the aforementioned step S1003 has decreased to be equal to or lower than a specific number of revolutions that has been set in advance.

If it is determined in the aforementioned step S1004 that the number of engine revolutions has not decreased to be equal to or lower than the specific number of revolutions, the ECU 13 executes the process of the above-described steps S1003 and S1004 again.

If it is determined in the aforementioned step S1004 that the number of engine revolutions has decreased to be equal to or lower than the specific number of revolutions, the process of the ECU 13 proceeds to step S1005, and the ECU 13 determines whether or not one cylinder 2 among the four cylinders (that cylinder will be referred to as a specific cylinder hereinafter) is on the intake stroke. For example, in the case that the specific cylinder 2 is the first cylinder 2, the ECU 13 can determine that the specific cylinder 2 is on the intake stroke on condition that the crank angle is in the range of 360° to 540°.

If it is determined in the aforementioned step S1005 that the aforementioned specific cylinder 2 is not on the intake stroke, the ECU 13 executes the process of the aforementioned S1005 repeatedly until the aforementioned specific cylinder 2 gets on the intake stroke.

If it is determined in the aforementioned step S1005 that the aforementioned specific cylinder 2 is on the intake stroke, the process of the ECU 13 proceeds to step S1006, and the ECU 13 causes the fuel injection valve 9 of the aforementioned specific cylinder 2 to operate.

In this case, fuel injected from the aforementioned fuel injection valve 9 is taken into the aforementioned specific cylinder 2 together with air in the intake port 8 to form air-fuel mixture.

In connection with this, the time at which the fuel injection valve 9 of the specific cylinder 2 is caused to operate is not limited to a time at which the specific cylinder 2 is on the intake stroke, but it may be a time at which the specific cylinder 2 is on the exhaust stroke.

In step S1007, the ECU 13 determines whether or not the aforementioned specific cylinder 2 is on the expansion stroke. For example, in the case that the specific cylinder 2 is the first cylinder 2, the ECU 13 can determines that the specific cylinder 2 is on the expansion stroke 2, on condition that the crank angle is in the range of 0° to 180°.

If it is determined in the aforementioned S1007 that the aforementioned specific cylinder 2 is not on the expansion stroke, the ECU 13 executes the process of the aforementioned S1007 repeatedly until the aforementioned specific cylinder 2 gets on the expansion stroke.

If it is determined in the aforementioned step S1007 that said specific cylinder 2 is on the expansion stroke, the process of the ECU 13 proceeds to step S1008, and the ECU 13 executes a crankshaft stop process so as to stop the rotation of the crankshaft 10.

In the crankshaft stop process the ECU 13 may cause, for example, the motor generator 100 to operate as a generator to stop the rotation of the crankshaft 10, or cause the motor generator 100 to rotate in the direction reverse to the rotation of the crankshaft 10 to stop the rotation of the crankshaft 10.

In that process, it is preferable that the stop position of the crankshaft 10 be a position between the expansion stroke top dead center and the expansion stroke bottom dead center of the specific cylinder at which the pressure in the interior of the specific cylinder 2 is substantially equal to the atmospheric pressure.

This is because if the pressure in the interior of the specific cylinder 2 is excessively higher than the atmospheric pressure, it is considered that the air-fuel mixture in the interior of the specific cylinder 2 can leak through a gap between the piston and the cylinder etc. while the driving stop time of the internal combustion engine 1.

If the rotation of the crankshaft 10 is stopped when the specific cylinder 2 is on the expansion stroke in this way, the driving of the internal combustion engine 1 will be stopped in the state in which unburned air-fuel mixture is sealed in the interior of the specific cylinder 2.

Referring back to FIG. 10, in step S1009, the ECU 13 stores information for identifying the aforementioned specific cylinder 2 in the backup RAM and finishes the execution of this routine.

As per the above, with the execution of the stop control routine by the ECU 13, it is possible to cause the specific cylinder 2 to be the expansion stroke cylinder upon stoppage 2 and to seal unburned air-fuel mixture in the interior of the specific cylinder 2.

In connection with the above, it is preferable that the aforementioned specific cylinder 2 be changed every time the driving of the internal combustion engine 1 is stopped.

This is because if the specific cylinder is the same cylinder every time the driving of the internal combustion engine 1 is stopped, the degree of bore flushing (the phenomenon in which an oil film formed on the inner wall of a cylinder is flushed away) or the wet fuel amount (the amount of fuel adhering on the wall of the intake port or the cylinder) will differ between the specific cylinder and the other cylinders.

In the stop control routine of this embodiment, the process of step S1002 constitutes the driving stop portion 13h, the process of step S1006 constitutes the fuel injection control portion 13i, and the process of step S1008 constitutes the output shaft stop portion 13j.

Subsequently, when the conditions for starting the internal combustion engine 1 are met, the ECU 13 will execute the start control routine shown in FIG. 11. In this start control routine, the ECU 13 firstly determines in step S1101 whether or not the start conditions for the internal combustion engine are met.

If it is determined in the aforementioned step S1101 that the start conditions are not met, the ECU 13 terminates the execution of this routine.

On the other hand, if it is determined in the aforementioned step S1101 that the start conditions are met, the process of the ECU 13 proceeds to step S1102, and the ECU 13 reads the aforementioned information for identifying the specific cylinder 2 and determines the specific cylinder 2 in accordance with the identification information.

In step S1103, the ECU 13 causes the ignition plug 5 of the specific cylinder 2 determined in the aforementioned step S1102.

On that occasion, the unburned air-fuel mixture sealed in the interior of the specific cylinder 2 is ignited and burned, whereby combustion pressure is generated to act so as to rotate the crankshaft 10. Thus, the crankshaft 10 is rotated without utilizing the power of the motor generator 100. In other words, the cranking of the internal combustion engine 1 is achieved by the combustion of the air-fuel mixture in the interior of the expansion stroke cylinder upon stoppage 2.

The process of steps S1104 to S1107 is the same as the process of steps S405 to S408 of the start control routine in the above-described first embodiment.

As per the above, with the execution of the start control routine by the ECU 13, the cranking of the internal combustion engine 1 can be achieved utilizing the combustion pressure generated upon combustion of the unburned air-fuel mixture in the interior of the specific cylinder 2.

Incidentally, the process of step S1103 in the start control routine of this embodiment constitutes the start control portion 13k.

Therefore, according to the start control apparatus for an internal combustion engine according to this embodiment, the advantageous effects same as the above-described first embodiment can be achieved. Furthermore, in the start control apparatus for an internal combustion engine according to this embodiment, since it is possible to seal unburned air-fuel mixture in the interior of the specific cylinder 2 by causing the fuel injection valve 9 of the specific cylinder to operate only at once during the time period required for engine stop, the fuel consumption can be reduced as compared to the start control apparatus for an internal combustion engine according to the first embodiment.

Incidentally, in case that the specific cylinder 2 is stopped during the compression stroke preceding the expansion stroke upon stoppage of the driving of the internal combustion engine 1, the ECU 13 may cause the motor generator to operate 100 so as to rotate the crankshaft 10 until the specific cylinder 2 gets on the expansion stroke.

Specifically, the ECU 13 determines whether the specific cylinder 2 is on the compression stroke or the expansion stroke based on the crank angle upon stoppage.

If it is determined that the specific cylinder 2 is on the expansion stroke, the ECU 13 executes, upon the next start of the internal combustion engine 1, the start control routine as described with reference to FIG. 11 to start the internal combustion engine 1.

On the other hand, if it is determined that the specific cylinder 2 is on the compression stroke, the ECU 13 causes, upon stopping the driving of the internal combustion engine 1 or upon the next start of the internal combustion engine 1, the motor generator 100 to operate until the aforementioned specific cylinder 2 gets on the expansion stroke. In addition, the ECU 13 causes, upon the next start of the internal combustion engine 1, the ignition plug 5 of the specific cylinder to operate on condition that the specific cylinder 2 is on the expansion stroke.

In this case, although the motor generator 100 is caused to operate until the specific cylinder 2 shifts from the compression stroke to the expansion stroke, the operating time of the motor generator 100 on that occasion is very short as compared to the case in which the cranking is achieved by the motor generator 100 alone. In addition, after the expansion stroke cylinder upon stoppage 2 gets on the expansion stroke, the cranking of the internal combustion engine 1 can be achieved by combustion of the unburned air-fuel mixture in the interior of the expansion stroke cylinder upon stoppage 2. Therefore, the load on the motor generator 100 upon starting the engine can be reduced.

Here, the process that the motor generator 100 is caused to operate until the specific cylinder 2 gets on the expansion stroke in the stop control or the start control constitutes the output shaft rotating portion 131.

Furthermore, although in the stop control in this embodiment, the ECU 13 stops the rotation of the crankshaft 10 while the specific cylinder 2 is on the expansion stroke, the ECU 13 may be adapted to stop the rotation of the crankshaft 10 while the specific cylinder 2 is on the compression stroke.

In this case, upon start control, the ECU 13 activates the ignition plug 5 of the specific cylinder 2 after causing the motor generator 100 to operate until the specific cylinder 2 gets on the expansion stroke.

When the above-described stop control and start control are executed, although the motor generator 100 is operated until the specific cylinder 2 shifts from the compression stroke to the expansion stroke, the operating time of the motor generator 100 on that occasion is very short as compared to the case in which the cranking is achieved by the motor generator 100 alone. In addition, after the specific cylinder 2 gets on the expansion stroke, the cranking of the internal combustion engine 1 can be achieved by combustion of the unburned air-fuel mixture in the interior of the specific cylinder 2. Therefore, the load on the motor generator 100 upon starting the engine can be reduced.

In this case, the process that the motor generator 100 is caused to operate until the specific cylinder 2 gets on the expansion stroke in the start control constitutes the output shaft rotating portion 131.

In the first to third embodiments described in the foregoing, if the time elapsed from the stoppage to the start of the driving of the internal combustion engine 1 becomes excessively long, it is considered that the air-fuel mixture in the interior of the expansion stroke cylinder upon stoppage 2 will be separated into fuel and air and the combustibility will be deteriorated. Therefore, it is preferable that the internal combustion engine 1 be started forcibly at the time when the time elapsed since the stoppage of the driving of the internal combustion engine 1 becomes equal to or larger than a predetermined time.

In the case that the internal combustion engine 1 is adapted to be forcibly started at the time when the time elapsed since the stoppage of the driving of the internal combustion engine 1 becomes equal to or larger than a predetermined value as described above, it is possible to prevent deterioration of combustibility of the air-fuel mixture in the interior of the expansion stroke cylinder upon stoppage 2 to thereby ensure combustion of the air-fuel mixture in the interior of the expansion stroke cylinder upon stoppage 2 upon starting the internal combustion engine 1.

According to the start control apparatus for an internal combustion engine according to the present invention, in an internal combustion engine provided with a fuel injection valve(s) for injecting fuel into an intake passage, it is possible to burn fuel in the interior of a cylinder upon starting the internal combustion engine, so that the internal combustion engine can be started utilizing a pressure generated upon combustion of the fuel.

What is claimed is:

1. A start control apparatus for an internal combustion engine comprising:
  a fuel injection valve for injecting fuel into an intake passage of the internal combustion engine;
  an ignition plug for igniting in the interior of a cylinder of the internal combustion engine;
  an ignition suspending portion for suspending the operation of said ignition plug, when a driving stop condition for the internal combustion engine is met; and
  a start control portion for causing the ignition plug of a cylinder that is on the expansion stroke to operate, when a start condition for the internal combustion engine is met,
  wherein said ignition suspending portion once suspends the operation of said ignition plug and said fuel injection valve when said driving stop condition is met and causes only said fuel injection valve to operate again just before rotation of an engine output shaft of the internal combustion engine stops.

2. A start control apparatus according to claim 1, wherein the internal combustion engine includes a plurality of cylinders and said start control portion determines, when said start condition for the internal combustion engine is met, which of said cylinders is on the expansion stroke based on a crank angle upon stoppage of the internal combustion engine.

3. A start control apparatus for an internal combustion engine according to claim 1, wherein said start control portion causes the ignition plug of the cylinder that is on the compression stroke when the start condition for the internal combustion engine is met to operate in addition to the ignition plug of said cylinder that is on the expansion stroke when the start condition for the internal combustion engine is met, and upon causing the ignition plug of said cylinder that is on the expansion stroke and the ignition plug of said cylinder that is on the compression stroke to operate, said start control portion firstly causes the ignition plug of said cylinder that is on the expansion stroke to operate and subsequently causes the ignition plug of said cylinder that is on the compression stroke to operate at the time when said cylinder that is on the compression stroke gets on the expansion stroke.

4. A start control apparatus for an internal combustion engine according to claim 1, wherein said start control portion includes a motor generator annexed to said internal combustion engine, a rotation shaft of the motor generator being connected with the engine output shaft of said internal combustion engine, and
  said start control portion causes said motor generator to operate as a motor, in case that the number of engine revolutions of said internal combustion engine after said ignition plug is caused to operate is smaller than a predetermined number of revolutions while the start condition for said internal combustion engine is met.

5. A start control apparatus for an internal combustion engine according to claim 4, wherein said start control portion starts said internal combustion engine without causing said motor generator to operate as a motor, in case that the number of engine revolutions of said internal combustion engine after said ignition plug is caused to operate is equal to or larger than a predetermined number of revolutions while the start condition for said internal combustion engine is met.

6. A start control apparatus for an internal combustion engine according to claim 1, wherein said start control portion starts the internal combustion engine forcibly in case that driving stop time of the internal combustion engine becomes equal to or longer than a predetermined time period.

7. A start control apparatus for an internal combustion engine comprising:
- a fuel injection valve for injecting fuel into an intake passage of the internal combustion engine;
- an ignition plug for igniting in the interior of a cylinder of the internal combustion engine;
- a driving stop portion for suspending the operation of said ignition plug and said fuel injection valve, when a driving stop condition for the internal combustion engine is met;
- an estimate portion for estimating a cylinder that will be on the compression stroke or expansion stroke upon stoppage of rotation of an engine output shaft of the internal combustion engine;
- a fuel injection control portion for causing the fuel injection valve of the cylinder that is estimated by said estimate portion to operate again, just before rotation of the engine output shaft of the internal combustion engine stops; and
- a start control portion for causing the ignition plug of the cylinder that is estimated by said estimate portion to operate, when a start condition for the internal combustion engine is met.

8. A start control apparatus for an internal combustion engine according to claim 7, further comprising output shaft rotating portion for rotating, in case that rotation of the engine output shaft stops while the cylinder estimated by said estimate portion is on the compression stroke, the engine output shaft until said cylinder gets on the expansion stroke.

9. A start control apparatus for an internal combustion engine according to claim 7, wherein said estimate portion estimates a cylinder that will be on the expansion stroke upon stoppage of rotation of the engine output shaft of said internal combustion engine and a cylinder that will be on the compression stroke upon stoppage of rotation of the engine output shaft of said internal combustion engine, and when said start condition for the internal combustion engine is met, said start control portion firstly causes the ignition plug of said cylinder on the expansion stroke to operate and subsequently causes the ignition plug of said cylinder on the compression stroke to operate at the time when said cylinder on the compression stroke gets on the expansion stroke.

10. A start control apparatus for an internal combustion engine according to claim 7, wherein said estimate portion estimates the cylinder that will be on the compression stroke or expansion stroke upon stoppage of rotation of the engine output shaft of said internal combustion engine based on a crank angle at the time when rotation of the engine output shaft of said internal combustion engine after the suspension of the operation of said ignition plug and said fuel injection valve decreases down to a specific rotation speed.

11. A start control apparatus for an internal combustion engine according to claim 10, wherein said estimate portion estimates the cylinder that will be on the compression stroke or expansion stroke upon stoppage of rotation of the engine output shaft of said internal combustion engine further based on temperature of lubricant in said internal combustion engine.

12. A start control apparatus for an internal combustion engine according to claim 10, wherein said estimate portion estimates the cylinder that will be on the compression stroke or expansion stroke upon stoppage of rotation of the engine output shaft of said internal combustion engine further based on temperature of cooling water in said internal combustion engine.

13. A start control apparatus for an internal combustion engine according to claim 7, wherein said start control portion includes a motor generator annexed to said internal combustion engine, a rotation shaft of the motor generator being connected with the engine output shaft of said internal combustion engine, and
- said start control portion causes said motor generator to operate as a motor, in case that the number of engine revolutions of said internal combustion engine after said ignition plug is caused to operate is smaller than a predetermined number of revolutions while the start condition for said internal combustion engine is met.

14. A start control apparatus for an internal combustion engine according to claim 13, wherein said start control portion starts said internal combustion engine without causing said motor generator to operate as a motor, in case that the number of engine revolutions of said internal combustion engine after said ignition plug is caused to operate is equal to or larger than a predetermined number of revolutions while the start condition for said internal combustion engine is met.

15. A start control apparatus for an internal combustion engine according to claim 7, wherein said start control portion starts the internal combustion engine forcibly in case that driving stop time of the internal combustion engine becomes equal to or longer than a predetermined time period.

16. A start control apparatus for an internal combustion engine comprising:
- a fuel injection valve for injecting fuel into an intake passage of the internal combustion engine;
- an ignition plug for igniting in the interior of a cylinder of the internal combustion engine;
- a driving stop portion for suspending the operation of said ignition plug and said fuel injection valve, when a driving stop condition for the internal combustion engine is met;
- a fuel injection control portion for causing the fuel injection valve of a specific cylinder to operate again before rotation of an engine output shaft of the internal combustion engine stops;
- an output shaft stop portion for stopping rotation of said engine output shaft at the time when said specific cylinder gets on the compression stroke or the expansion stroke; and
- a start control portion for causing the ignition plug of said specific cylinder to operate, when a start condition for the internal combustion engine is met.

17. A start control apparatus for an internal combustion engine according to claim 16, further comprising an output shaft rotating portion for rotating, in case that rotation of the engine output shaft stops while said specific cylinder is on the compression stroke, the engine output shaft until said specific cylinder gets on the expansion stroke.

18. A start control apparatus for an internal combustion engine according to claim 16, wherein said fuel injection control portion causes the fuel injection valve of said specific cylinder to operate again during the intake stroke of said specific cylinder before rotation of the engine output shaft stops.

19. A start control apparatus for an internal combustion engine according to claim 16, wherein said fuel injection control portion causes the fuel injection valve of said specific cylinder to operate again during the exhaust stroke of said specific cylinder before rotation of the engine output shaft stops.

20. A start control apparatus according to claim 16, wherein said output shaft stop portion determines that said specific cylinder gets on the compression stroke or the expansion stroke based on a crank angle of said internal combustion engine.

21. A start control apparatus for an internal combustion engine according to claim 16, wherein said output shaft stop portion includes a motor generator annexed to said internal combustion engine, a rotation shaft of the motor generator being connected with the engine output shaft of said internal combustion engine, and said output shaft stop portion stops rotation of said engine output shaft by causing the motor generator to operate as a generator.

22. A start control apparatus for an internal combustion engine according to claim 16, wherein said output shaft stop portion includes a motor generator annexed to said internal combustion engine, a rotation shaft of the motor generator being connected with the engine output shaft of said internal combustion engine, and said output shaft stop portion stops rotation of said engine output shaft by rotating the motor generator in the direction reverse to the direction of rotation of the engine output shaft of said internal combustion engine.

23. A start control apparatus for an internal combustion engine according to claim 16, wherein said output shaft stop portion stops rotation of said engine output shaft at a position between the expansion stroke top dead center and the expansion stroke bottom dead center of said specific cylinder at which the pressure in the interior of said specific cylinder is substantially equal to the atmospheric pressure.

24. A start control apparatus for an internal combustion engine according to claim 16 wherein said specific cylinder is changed every time driving of said internal combustion engine is stopped.

25. A start control apparatus for an internal combustion engine according to claim 16, wherein said start control portion includes a motor generator annexed to said internal combustion engine, a rotation shaft of the motor generator being connected with the engine output shaft of said internal combustion engine, and said start control portion causes said motor generator to operate as a motor, in case that the number of engine revolutions of said internal combustion engine after said ignition plug is caused to operate is smaller than a predetermined number of revolutions while the start condition for said internal combustion engine is met.

26. A start control apparatus for an internal combustion engine according to claim 25, wherein said start control portion starts said internal combustion engine without causing said motor generator to operate as a motor, in case that the number of engine revolutions of said internal combustion engine after said ignition plug is caused to operate is equal to or larger than a predetermined number of revolutions while the start condition for said internal combustion engine is met.

27. A start control apparatus for an internal combustion engine according to claim 16, wherein said start control portion starts the internal combustion engine forcibly in case that driving stop time of the internal combustion engine becomes equal to or longer than a predetermined time period.

* * * * *